United States Patent
Ishikawa

(10) Patent No.: US 7,066,421 B2
(45) Date of Patent: Jun. 27, 2006

(54) RECORDING TAPE CARTRIDGE

(75) Inventor: Ren Ishikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 22 days.

(21) Appl. No.: 11/007,280

(22) Filed: Dec. 9, 2004

(65) Prior Publication Data

US 2005/0127224 A1 Jun. 16, 2005

(30) Foreign Application Priority Data

Dec. 10, 2003 (JP) ............................. 2003-411146

(51) Int. Cl.
 *G11B 23/04* (2006.01)
(52) U.S. Cl. .................... 242/338.1; 242/348; 360/132
(58) Field of Classification Search ............. 242/332.4, 242/348, 348.2, 338, 338.1; 360/132
 See application file for complete search history.

(56) References Cited

U.S. PATENT DOCUMENTS

| | | | |
|---|---|---|---|
| 5,901,916 A | 5/1999 | McAllister et al. | |
| 6,452,748 B1 * | 9/2002 | Shima et al. ................. | 360/132 |
| 6,462,905 B1 * | 10/2002 | Takahashi et al. ........... | 360/132 |
| 6,581,866 B1 * | 6/2003 | Tsuyuki et al. .............. | 242/348 |
| 6,814,326 B1 * | 11/2004 | Tsuyuki et al. .............. | 242/348 |
| 6,886,765 B1 * | 5/2005 | Amano et al. ............ | 242/338.1 |
| 6,955,317 B1 * | 10/2005 | Ishihara .................... | 242/338.1 |
| 2003/0128468 A1 * | 7/2003 | Morita et al. ................ | 360/132 |
| 2005/0127224 A1 * | 6/2005 | Ishikawa .................. | 242/338.1 |

FOREIGN PATENT DOCUMENTS

| | | |
|---|---|---|
| JP | 63-251983 A | 10/1988 |
| JP | 11-250618 A | 9/1999 |
| JP | 2003-45143 A | 2/2003 |

* cited by examiner

*Primary Examiner*—William A. Rivera
(74) *Attorney, Agent, or Firm*—Sughrue Mion, PLLC

(57) ABSTRACT

A recording tape cartridge is disclosed wherein when in non-use, a reel accommodated in a case and having a recording tape wound thereon is prevented from rotating by being meshed with a braking member which is non-rotatble with reference to the case; and when in use, in response to the braking member being pushed up by a release pad or a clutch member, the reel is released from the meshed state and allowed to rotate together with the release pad or the clutch member. With the rotation of the reel, the braking member has its pivot portion disposed in sliding contact with a sliding contact portion formed at a portion corresponding to an axial center of the release pad or the clutch member while being pressed against the sliding contact portion by a biasing force of a compression coil spring. The recording tape cartridge is designed such that a relation $\mu \times L \leq 0.4$ holds between a length L (mm) of the compression coil spring along the axis line of the reel when the reel rotates together with the release pad or the clutch member and a coefficient of dynamic friction $\mu$ between the pivot portion of the braking member and the sliding contact portion of the release pad or the clutch member.

19 Claims, 15 Drawing Sheets

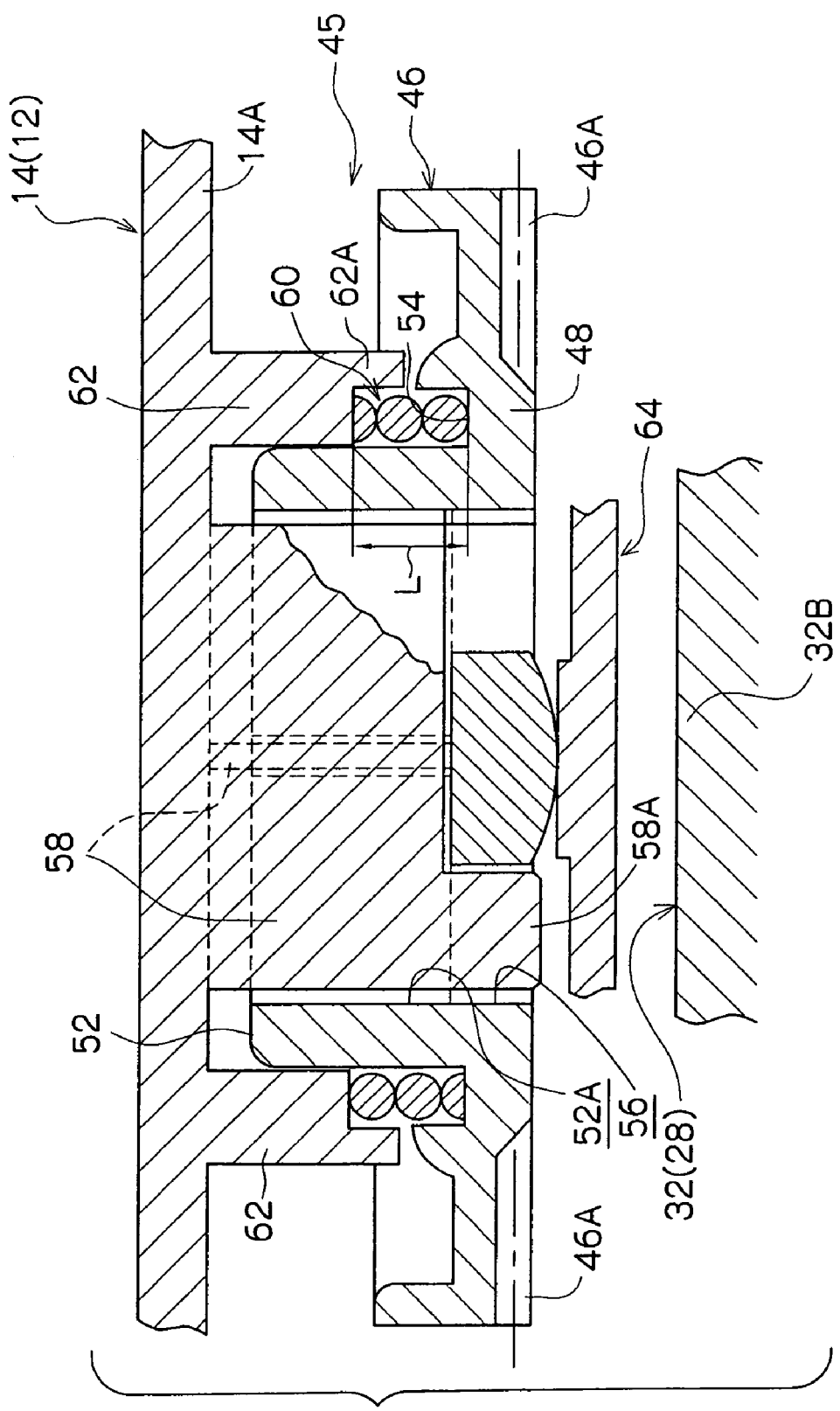

RECORDING TAPE CARTRIDGE

CROSS-REFERENCE TO RELATED APPLICATION

This application claims priority under 35 USC 119 from Japanese Patent Application No. 2003-411146, the disclosure of which is incorporated by reference herein

BACKGROUND OF THE INVENTION

1. Field of the Invention

The present invention relates to a recording tape cartridge which rotatably accommodates a reel on which a recording tape such as a magnetic tape or the like is wound.

2. Description of the Related Art

A recording tape such as a magnetic tape is used as an external recording medium for a computer or the like, and a so-called 1-reel recording tape cartridge is employed which rotatably accommodates a single reel of a recording tape. Advantageously, this type of recording tape cartridge requires only a small storage space and yet is capable of recording a large amount of information.

Such a recording tape cartridge includes a lock mechanism, which prevents a reel from being rotated when the recording tape cartridge is not used (for example, see Japanese Patent Application Laid-Open (JP-A) No. 63-251983). The recording tape cartridge including such a lock mechanism will be described below with reference to FIG. 10. In a recording tape cartridge 200 shown in FIG. 10, a single reel 204 is accommodated in the case 202. The case 202 has a gear opening 206 formed in a central portion of a bottom panel 202A and a rotation regulating rib 208 which is formed in such a manner as to project downward from the top panel 202B of the case 202.

The reel 204 has a reel hub 210, which has a bottomed cylindrical shape including a bottom and an outer periphery on which a recording tape is wound. A reel gear 214 which can be engaged with a drive gear 212A formed on a rotating shaft 212 of a drive device is circularly formed on the lower surface of a bottom portion 210A of the reel hub 210. Meanwhile, an engagement gear 216 is circularly formed on the upper surface of the bottom portion 210A. A through hole 218 is formed in a portion corresponding to the axial center of the bottom portion 210A. An annular reel plate 219 of a magnetic material is fixed between the reel gear 214 and the through hole 218 on the lower surface of the bottom portion 210A.

A disk-like braking member (pushed member) 220 having a lower surface on which an annular braking gear 220A, which can be meshed with the engagement gear 216, is formed is inserted into the reel hub 210. The rotation regulating rib 208 of the case 202 is inserted into an engagement projection 222 extending from the upper surface of the braking member 220, so that the braking member 220 cannot be rotated with reference to the case 202 and can be vertically moved with reference to the case 202. In addition, a pivot portion 223 formed projecting from a portion corresponding to the axial center of the lower surface of the braking member 220 intrudes into the through hole 218 of the reel hub 210 to face the gear opening 206.

A compression coil spring 224 is interposed between the top panel 202B of the case 202 and the braking member 220. Usually, the braking member 220 is downwardly biased by a biasing force of the compression coil spring 224 to cause the braking gear 220A to be meshed with the engagement gear 216. In this manner, when not in use, the recording tape cartridge 200 is set in a rotation lock state in which the reel 204 is prevented from being rotated with reference to the case 202. The reel 204 exposes the reel gear 214 from the gear opening 206 while being pressed against the bottom panel 202A of the case 202 by the biasing force of the spring 224.

On the other hand, when the recording tape cartridge 200 is loaded into the drive device, with the meshing operation between the drive gear 212A and the reel gear 214, a release portion 212B formed to project from a portion corresponding to the axial center of the rotating shaft 212 is brought into contact with the pivot portion 223 to press the pivot portion 223. In this manner, the braking member 220 is pushed up against the biasing force of the compression coil spring 224 to release the meshing state between the braking gear 220A and the engagement gear 216.

The drive gear 212A is completely meshed with the reel gear 214, and the reel plate 219 is attracted by the magnetic force of a magnet 212C of the rotating shaft 212. In this state, when the rotating shaft 212 rotates about its axis, the reel 204 is rotated together with the rotating shaft 212. At this time, the braking member 220 cannot rotate with reference to the case 202, so that the pivot portion 223 and the release portion 212B are disposed in sliding contact with each other while being pressed against each other by the biasing force of the compression coil spring 224. In order to reduce the sliding contact resistance, the pivot portion 223 of the braking member 220 is formed by a resin material, and the release portion 212B on the drive device side is also formed from a resin material. Further, the distal end of the pivot portion 223 is tapered to reduce the contact area.

A configuration in which a release member is interposed between the braking member 220 and the rotating shaft 212 is known in the art (for example, see Japanese Patent No. 3,187,022). Parts of this configuration different from those of the recording tape cartridge 200 will be described below with reference to FIGS. 11 and 12.

A recording tape cartridge 250 shown in FIG. 11 includes a release member 252 formed of a resin material which is interposed between the bottom portion 210A of the reel hub 210 and the braking member 220. The release member 252, as shown in FIG. 12, is formed in the shape of a substantially equilateral triangle when viewed from the upper side and includes leg portions 254 formed to project from respective apex portions downward. The leg portions 254 intrude into through holes 256 formed in the bottom portion 210A in place of the through hole 218 to face the gear opening 206. The through holes 256 are formed to extend through a portion where the reel gear 214 is formed on the bottom portion 210A.

A plurality of engagement projections 258 are provided on the upper surface of the bottom portion 210A in place of the engagement gear 216. The engagement projections 258 are arranged at equal intervals along a predetermined circumference to avoid the apex portions of the release member 252. Gear teeth 258A which can be meshed with the braking gear 220A are formed on the upper ends of the engagement projections 258. A sliding contact projection 260 is formed to project from the axial center portion of the upper surface of the release member 252. The sliding contact projection 260 can be always disposed in contact with a generally spherical pivot portion 262 arranged on the braking member 220 in place of the pivot portion 223. Both the sliding contact projection 260 and the pivot portion 262 consist of a resin material, and the pivot portion 262 is formed to have a spherical shape, so that the sliding contact projection 260 and the pivot portion 262 are substantially in point contact with each other.

In the recording tape cartridge 250, when the cartridge is not in use, the braking gear 220A of the braking member 220 is meshed with the gear teeth 258A of the reel 204 by the biasing force of the compression coil spring 224 to prevent the reel 204 from being rotated with reference to the case 202. In this state, the release member 252 is brought into contact with the braking member 220 at the sliding contact projection 260, and the lower surface of the release member 252 is pressed against the bottom portion 210A. The end faces of the each leg portion 254 respectively located in the through holes 256 are on the same plane as the tooth tops of the reel gear 214.

On the other hand, when the recording tape cartridge 250 is loaded into the drive device, with an operation in which the reel gear 214 is meshed with a drive gear 212A of the rotating shaft 212 having no release portion 212B, the leg portions 254 are pressed by the drive gear 212A, and the release member 252 is pushed upward against the biasing force of the compression coil spring 224. As a result, the release member 252 pushes the braking member 220 upward while being separated from the bottom portion 210A to release the meshing state between the braking gear 220A and the gear teeth 258A. The release member 252 is designed to hold the braking member 220 at the released position by the contact of the leg portions 254 and the drive gear 212A under the condition that the meshing state between the drive gear 212A and the reel gear 214 is kept.

The reel 204 is designed to rotate in the case 202 when the rotating shaft 212 rotates. At this time, the release member 252 having the leg portions 254 intruded into the through holes 256 of the reel 204 rotate together with the reel 204. The sliding contact projection 260 and the pivot portion 262 of the braking member 220 are brought into sliding contact with each other while being pressed against each other by the biasing force of the compression coil spring.

As described above, in the recording tape cartridges 200 and 250, with the rotation of the reel 204, the pivot portion 223 of the braking member 220 is brought into sliding contact with the release portion 212B of the rotating shaft 212 or into sliding contact with the sliding contact projection 260 of the release member 252. For this reason, with the rotation of the reel 204 (release portion 212B or the release member 252), the braking member 220 supported by the compression coil spring 224 may be subjected to self-excited vibration.

The rotating speed of the reel 204 is expected to be made higher to cope with the demand for an increase in recording capacity or the like. With the high-speed rotation, it is feared that abrasion or melting of the resin material occurs at the sliding contact portions which are brought into sliding contact with each other while supporting the biasing force of the compression coil spring 224. When the state or the shape of the sliding contact surfaces are changed by the abrasion or the like, the self-excited vibration of the braking member 220 occurs more easily. Such self-excited vibration causes the biasing force of the compression coil spring 224 to vary. The varying biasing force is transmitted to the case and the reel to make the travelling state of the recording tape unstable.

In a structure including the release member 252, a configuration for reducing abrasion of the sliding contact portion between the braking member 220 and the release member 252 has been proposed (for example, see JP-A No. 11-250618). The configuration will be described with reference to FIG. 13. A curved-surface recess 264 is formed in the lower surface of the axial center portion of the braking member 220 in place of the pivot portion 262, and a pivot portion 266 which projects in a spherical shape is formed on the upper surface of the axial center of the release member 252 in place of the sliding contact projection 260. An annular projection 268 is formed around the pivot portion 266. At least one of the braking member 220 and the release member 252 consists of a low-friction, low-abrasion material. With the rotation of the reel 204, the curved-surface recess 264 and the pivot portion 266 are brought into sliding contact with each other in a point contact state, and the lower surface of the braking member 220 and the annular projection 268 are brought into sliding contact with each other in a surface contact state. In this manner, the braking member 220 and the release member 252 are brought into sliding contact with each other in a low-friction, low-abrasion state to reduce the abrasion of the sliding contact portion.

However, with such a configuration, it is difficult to completely prevent the abrasion which causes self-excited vibration to easily occur in the braking member 220 as described above.

Furthermore, the problem of the self-excited vibration may generally arise not only in a lock mechanism, which locks rotation of the reel in a nonuse state but also in a portion which is elastically supported and brought into sliding contact with a rotating portion as the reel rotates. For example, in a professional-use two-reel recording tape cartridge (tape cassette) used in a broadcasting station or the like, reels and reel holders which support the reels in a case are brought into sliding contact with each other with rotation of the reels (for example, see JP-A No. 2003-45143).

More specifically, as shown in FIGS. 14 and 15, a recording tape cartridge 270 rotatably accommodates two reels 274 in a case 272. Pivot portions 277 are formed on the upper surfaces of hubs 276 of each reel 274, respectively. Meanwhile, reel holders 280 are supported by a top panel 272A of the case 272 in correspondence to the two reels 274 via center caps 278, respectively, such that the reel holders 280 cannot rotate and can be vertically moved. The reel holders 280 are always in contact with the pivot portions 277 of the corresponding reels 274 while being biased downward by compression coil springs 282 of the corresponding reels 274. In this manner, each reel 274 is swingably supported with reference to the case 272.

In the recording tape cartridge 270, when the reels 274 rotates, the pivot portions 277 and the reel holders 280 are brought into sliding contact with each other while being pressed against each other by a biasing force of the compression coil springs 282. For this reason, in the recording tape cartridge 270, self-excited vibration of the reel holders 280 becomes a problem.

As will be appreciated from the above discussion, in the various conventional recording tape cartridges, no consideration has been paid to the problem of self-excited vibration of a member such as a braking member of a lock mechanism or a reel holder which is elastically supported with reference to a case and brought into sliding contact with a reel with rotation of the reel or a member rotating together with the reel, nor to means for solving this problem.

SUMMARY OF THE INVENTION

In view of the above, the present invention realizes a recording tape cartridge, which can suppress vibration generated by sliding contact between a member elastically supported on a case and a reel or a member rotating together with the reel.

According to a first aspect of the invention, there is provided a recording tape cartridge comprising a reel on which a recording tape is wound; a case which rotatably accommodates the reel; a pressed member which is supported in the case such that the pressed member cannot rotate and can move into and out of contact with the reel along the axis line of the reel; and an elastic member interposed between the case and the pressed member, the elastic member pressing, in a compression state, the pressed member against a portion near a center of rotation of the reel or a member rotating together with the reel during rotation of the reel; wherein a relation $\mu \times L \leq 0.4$ holds where L (mm) is a length of the elastic member being along the axis line of the reel during the rotation of the reel, and $\mu$ is a coefficient of dynamic friction between the pressed member and the reel or the member rotating together with the reel.

According to a second aspect of the invention, there is provided a recording tape cartridge comprising a reel having a reel hub provided with a first engagement portion and upper and lower flanges coaxially fixed to both end portions of the reel hub and having substantially equal diameters, a recording tape being wound on the reel hub between the upper and lower opposing flanges; a case having a top panel and a bottom panel and rotatably accommodating the reel; and a lock mechanism including a pressed member provided with a second engagement portion, the pressed member being disposed in the reel hub so as to be movable along an axis line of the reel and supported non-rotatably with reference to the case; an elastic member interposed between an inner surface of the case and the pressed member; and a release member disposed in the reel hub so as to be movable along the axis line and rotatable with the reel, wherein when the recording tape cartridge is in non-use, the second engagement portion of the pressed member is brought into engagement with the first engagement portion of the reel hub by a biasing force of the elastic member, thereby preventing the reel from rotating, and when the recording tape cartridge is in use, the pressed member is moved against the biasing force of the elastic member as a result of the release member being moved toward an inside of the case in response to the recording tape cartridge being loaded into a drive device, thereby releasing the engagement between the first engagement portion and the second engagement portion and allowing the reel to rotate; wherein a relation $\mu \times L \leq 0.4$ holds between a length L (mm) of the elastic member along an axis line of the reel when the elastic member is in a compressed state for allowing the reel to rotate and a coefficient of dynamic friction $\mu$ between the pressed member and the release member.

According to a third aspect of the present invention, there is provided a lock mechanism for a recording tape cartridge comprising a reel having a reel hub provided with a first engagement portion and upper and lower flanges coaxially fixed to both end portions of the reel hub and having substantially equal diameters, a recording tape being wound on the reel hub between the upper and lower opposing flanges, and a case having a top panel and a bottom panel and rotatably accommodating the reel, the lock mechanism comprising a pressed member provided with a second engagement portion, the pressed member being disposed in the reel hub so as to be movable along an axis line and supported nonrotatably with reference to the case; an elastic member interposed between an inner surface of the case and the pressed member; and a release member disposed in the reel hub so as to be movable along the axis line and rotatable with the reel, wherein when the recording tape cartridge is in non-use, the second engagement portion of the pressed member is brought into engagement with the first engagement portion of the reel hub by a biasing force of the elastic member, thereby preventing the reel from rotating, and when the recording tape cartridge is in use, the pressed member is moved against the biasing force of the elastic member as a result of the release member being moved toward an inside of the case in response to the recording tape cartridge being loaded into a drive device, thereby releasing the engagement between the first engagement portion and the second engagement portion and allowing the reel to rotate; wherein a relation $\mu \times L \leq 0.4$ holds between a length L (mm) of the elastic member along an axis line of the reel when the elastic member is in a compressed state for allowing the reel to rotate and a coefficient of dynamic friction $\mu$ between the pressed member and the release member.

In the recording tape cartridge according to the invention, in a state in which the pressed member is pressed against a portion near the axial center of the reel or a member (hereinafter referred to as "reel or the like") rotating together with the reel by a biasing force of the compressed elastic member, the reel rotates. For this reason, when the reel rotates, the pressed member, which does not rotate with reference to the case, and the reel or the like are brought into sliding contact with each other. The member rotating together with the reel may be a component (for example, a release member operated when rotation of the reel is unlocked) of the recording tape cartridge or a component (for example, a release member provided on a rotating shaft) of the drive device. The pressed member may be always pressed against the reel or the like by the biasing force of the elastic member.

In this case, a relational expression, $\mu \times L \leq 0.4$, which represents the relation between the length (hereinafter referred to as a load length of an elastic member) L of the elastic member along the axis line of the reel when the reel is rotated and the coefficient of dynamic friction $\mu$ between the pressed member and the reel or the like is a discriminant of stability. When the relation determined by the expression is not satisfied, amplitude of self-excited vibration of the pressed member may increase (oscillate) with a lapse of time. However, when the relation expressed by the expression is satisfied, self-excited vibration of the pressed member caused by sliding contact between the pressed member and the reel or the like during rotation of the reel is attenuated. More specifically, in this configuration which satisfies the discriminant for stability, vibration of the pressed member (periodical motion) is eliminated, or the amplitude of the vibration is considerably reduced.

In this manner, in the recording tape cartridge according to the present invention, vibration generated by sliding contact between the member elastically supported on the case and the reel or the member rotating together with the reel can be suppressed. For this reason, change in a biasing force of the elastic member with vibration of the pressed member can be suppressed, and the recording tape can be caused to stably travel. In addition, the load length L of the elastic member and the coefficient of dynamic friction $\mu$ are set to make it possible to prevent or suppress self-excited vibration of the pressed member. For this reason, the manufacturing cost of the recording tape cartridge can be reduced because the number of parts does not increase, in contrast with a configuration in which a vibration attenuating member or the like for reducing vibration of a pressed member is provided.

The term "portion near the center of rotation of the reel or the like" used herein is intended to take into consideration of dimensional error of the members, assembling error of the members, and displacement caused by abrasion.

As described above, the recording tape cartridge according to the invention has the advantage of being able to suppress vibration generated by sliding contact between the member elastically supported on the case and the reel or a member rotating together with the reel.

BRIEF DESCRIPTION OF THE DRAWINGS

FIG. 6 is an enlarged cross-sectional view showing the lock mechanism constituting the recording tape cartridge according to the embodiment of the invention.

DETAILED DESCRIPTION OF THE INVENTION

A recording tape cartridge 10 according to an embodiment of the present invention will be described below with reference to FIGS. 1A to 7B.

(Overall Configuration of Recording Tape Cartridge)

Figure 1A:
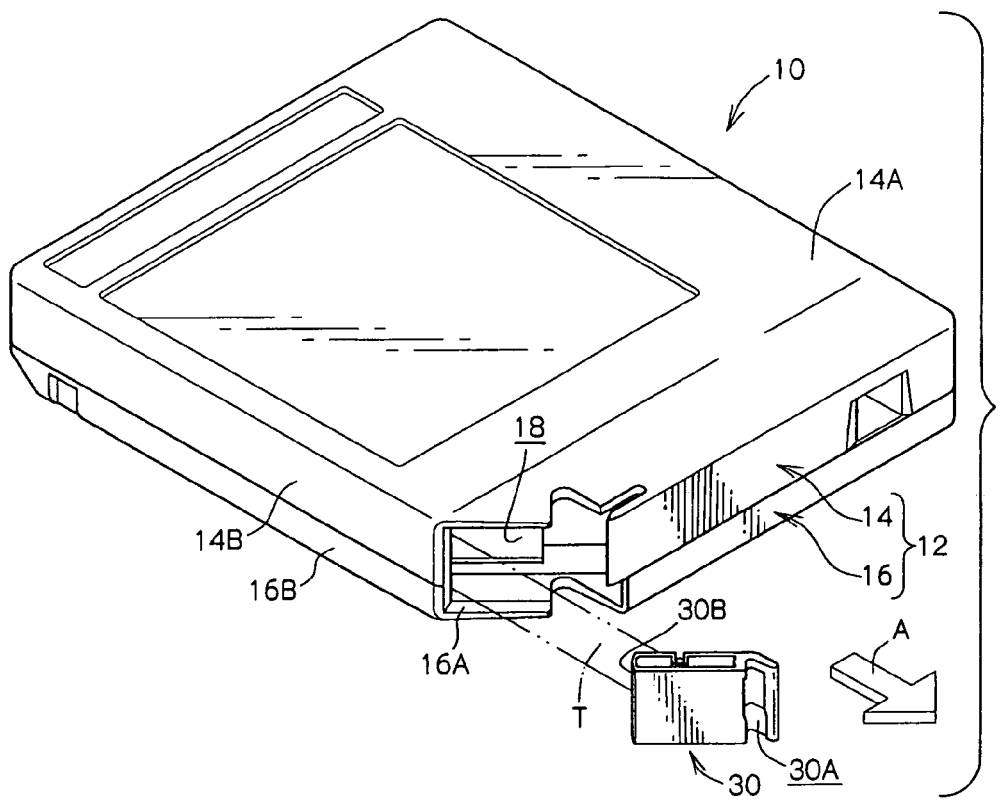
FIG. 1A is a diagram showing the external appearance of a recording tape cartridge according to an embodiment of the invention, which is a perspective view as seen from above.
Figure 1B:
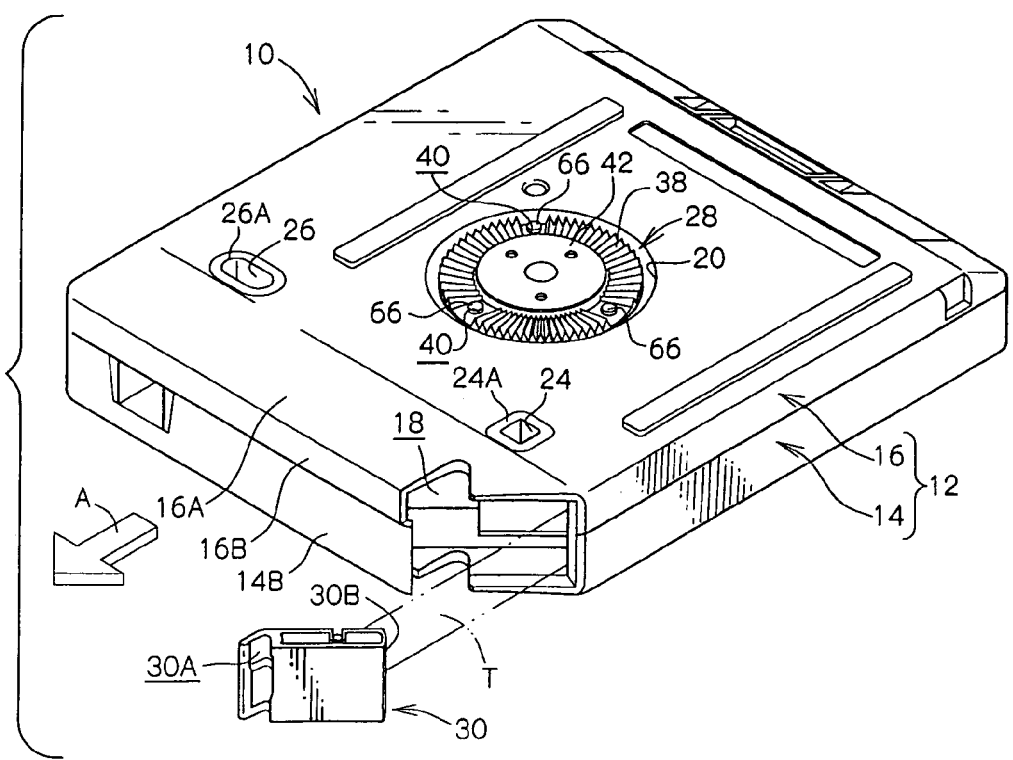
FIG. 1B is a perspective view of the recording tape cartridge of FIG. 1A as seen from below.
Figure 2:
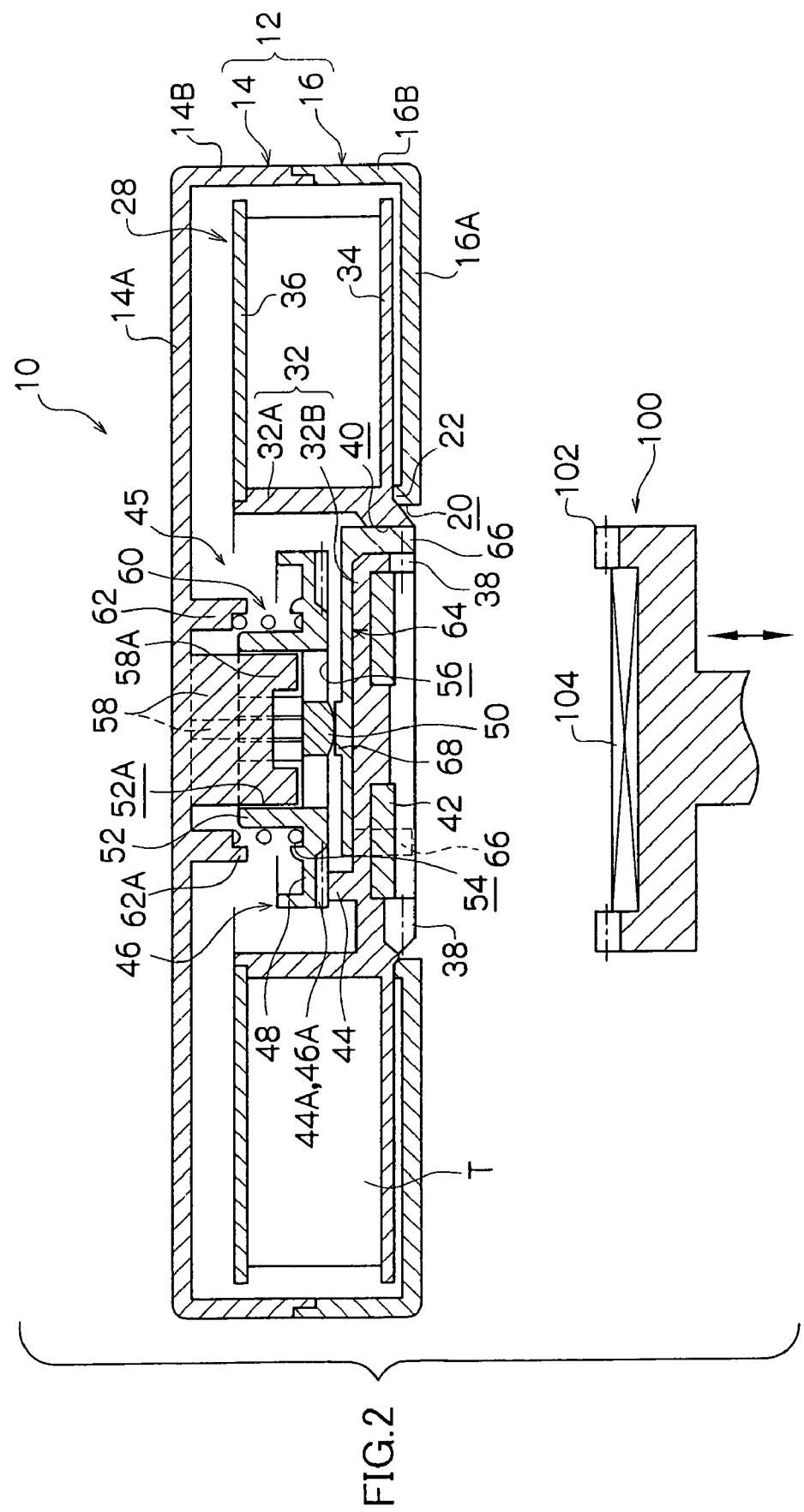
FIG. 2 is a cross-sectional view of the recording tape cartridge according to the embodiment of the present invention when the rotation of the reel is locked.

FIG. 1A is a perspective view showing the recording tape cartridge 10 as seen obliquely from above, and FIG. 1B is a perspective view of the recording tape cartridge 10 as seen obliquely from below. FIG. 2 is a cross-sectional view of the recording tape cartridge 10. An arrow A shown in FIG. 1 indicates a loading direction of the recording tape cartridge 10 into a drive device. For descriptive convenience, a side indicated by the arrow A is defined as the front side.

As illustrated in these figures, the recording tape cartridge 10 includes a case 12. The case 12 is formed by joining an upper case 14 and a lower case 16 to each other. More specifically, the upper case 14 is formed such that a generally frame-shaped peripheral wall 14B is provided upright along the edge of a top panel 14A, which has a generally rectangular shape as seen in a top plan view. The lower case 16 is formed such that a peripheral wall 16B is provided upright along the edge of a bottom panel 16A having a shape corresponding substantially to that of the top panel 14A. The case 12 is formed in a generally box-like shape such that the upper case 14 and the lower case 16 are joined to each other by ultrasonic welding, screw-clamping, or the like in a state in which an opening side of the peripheral wall 14B is in abutment with an opening side of the peripheral wall 16B.

In the case 12, at a corner portion on the leading side of the case in a loading direction for the drive device, the top panel 14A, the peripheral wall 14B, the bottom panel 16A, and the peripheral wall 16B are notched to form an opening 18 which is tilted in the loading direction. A circular gear opening 20 penetrating through the bottom panel 16A is formed near the center of the bottom panel 16A, and is used to expose a reel gear 38 which will be described later. An annular rib 22 is convexly formed on the edge of the gear opening 20 in the bottom panel 16A toward the inside of the case 12 to position a reel 28 which will be described later.

Further, a pair of positioning holes 24 and 26 are formed near the front end on the outer surface of the bottom panel 16A of the case 12. The pair of positioning holes 24 and 26 are formed in a bag-like shape in a projection (not shown) which is provided upright extending from the bottom panel 16A toward the inside of the case 12. The positioning holes 24 and 26 are spaced from each other on a phantom line perpendicular to the loading direction. The positioning hole 24 which is close to the opening 18 has a generally square shape as seen in a bottom plan view and circumscribes a positioning pin of the drive device when viewed from the bottom side, and the positioning hole 26 is a long hole extending along the phantom line and having a width corresponding to the diameter of the positioning pin.

In this manner, when the recording tape cartridge 10 is loaded in the drive device so that the positioning pins are inserted into the positioning holes 24 and 26, respectively, the recording tape cartridge 10 is accurately positioned in the horizontal direction (left and right, and front and rear) in the drive device.

Furthermore, portions around the positioning holes 24 and 26 on the bottom panel 16A are designed to serve as positioning surfaces 24A and 26A which are more smoothly finished than other portions (design surfaces). When the positioning pins are inserted into the positioning holes 24 and 26, respectively, the positioning surfaces 24A and 26A are brought into abutment with a positioning surface of the drive device which is provided around the positioning pins. In this manner, the vertical positioning of the recording tape cartridge 10 in the drive device can also be achieved simultaneously.

In the case 12 described above, as shown in FIG. 2, a reel 28 which will be described later is rotatably accommodated. Only one reel 28 is provided. A magnetic tape T serving as a recording tape is wound on the reel 28, and a leader block 30 serving as a drawing member is attached to the leading end of the magnetic tape T.

The leader block 30 is designed to be accommodated and held inside the opening 18 of the case 12 when the recording tape cartridge 10 is not in use. In this state, the leader block 30 closes the opening 18 to prevent dust or the like from entering the case 12. An engagement recess 30A is formed at the distal end of the leader block 30. When the magnetic tape T is drawn in the drive device, the magnetic tape T is drawn out of the case 12 by a drawing unit engaged with the engagement recess 30A and led to a take-up reel of the drive device. In addition, the leader block 30 uses an arc surface 30B as an end face opposing the engagement recess 30A to partially constitute a take-up surface which is fitted on the take-up reel and which takes up the magnetic tape T.

(Configuration of Reel)

Figure 3:
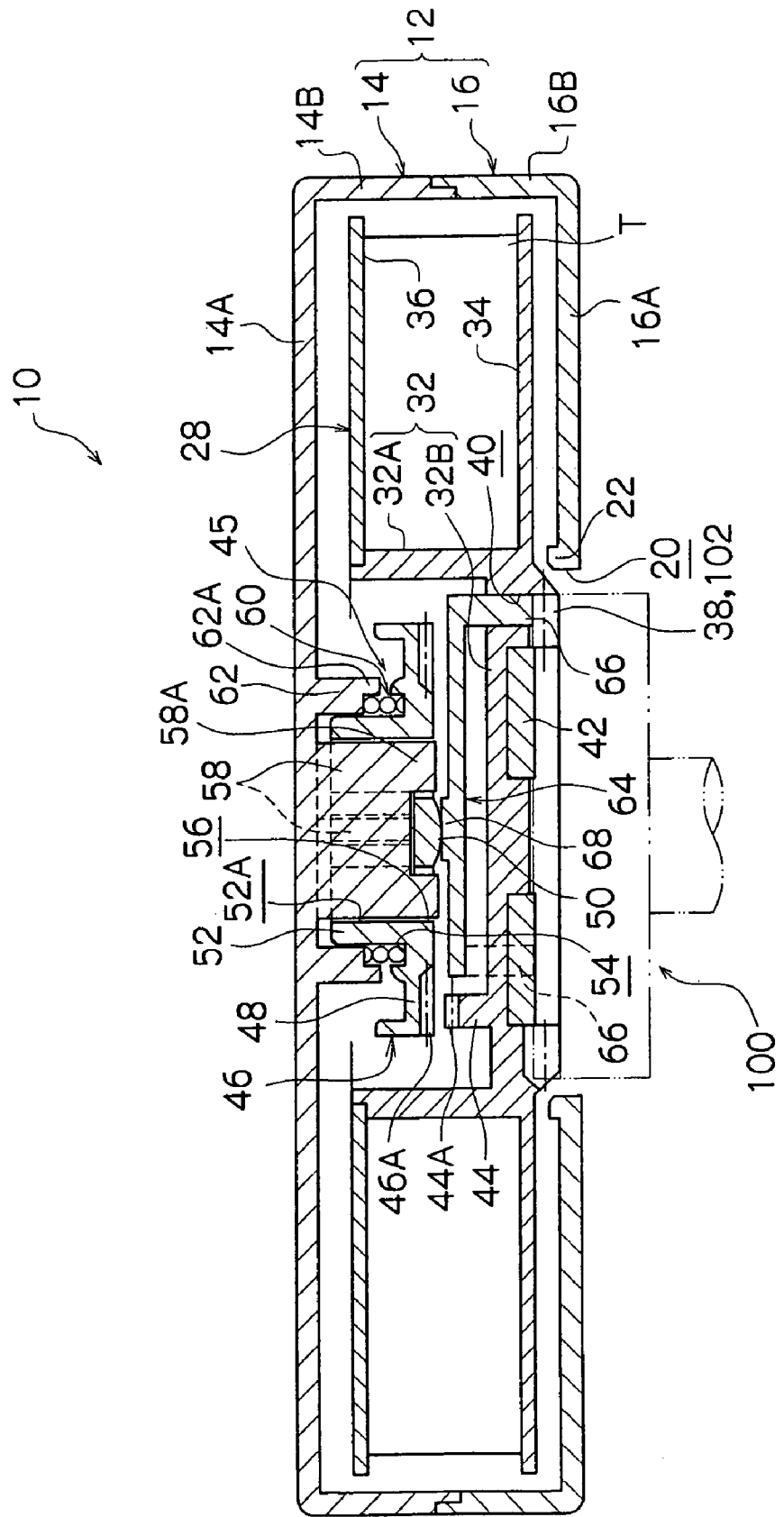
FIG. 3 is a cross-sectional view of the recording tape cartridge according to the embodiment of the invention when rotation of the reel is unlocked.

As shown in FIGS. 2 and 3, the reel 28 includes a reel hub 32 having a bottomed, generally cylindrical shape including a cylindrical portion 32A having a peripheral surface on which the magnetic tape T is wound and a bottom portion 32B which closes the lower end of the cylindrical portion 32A. Near the end portion (lower end portion) of the reel hub 32 on the bottom portion 32B side, a lower flange 34 is coaxially and integrally extended on the outside of the reel hub 32 in the radial direction. On the upper end portion of the reel hub 32, an upper flange 36 is coaxially attached by ultrasonic welding or the like. The upper flange has an inner diameter approximately equal to the inner diameter of the cylindrical portion 32A and an external diameter approximately equal to the outer diameter of the lower flange 34 In this manner, on the reel 28, the magnetic tape T is wound on the peripheral surface of the cylindrical portion 32A of the reel hub 32 between the opposing surfaces of the lower flange 34 and the upper flange 36. The cylindrical portion 32A opens upward.

Figure 5:
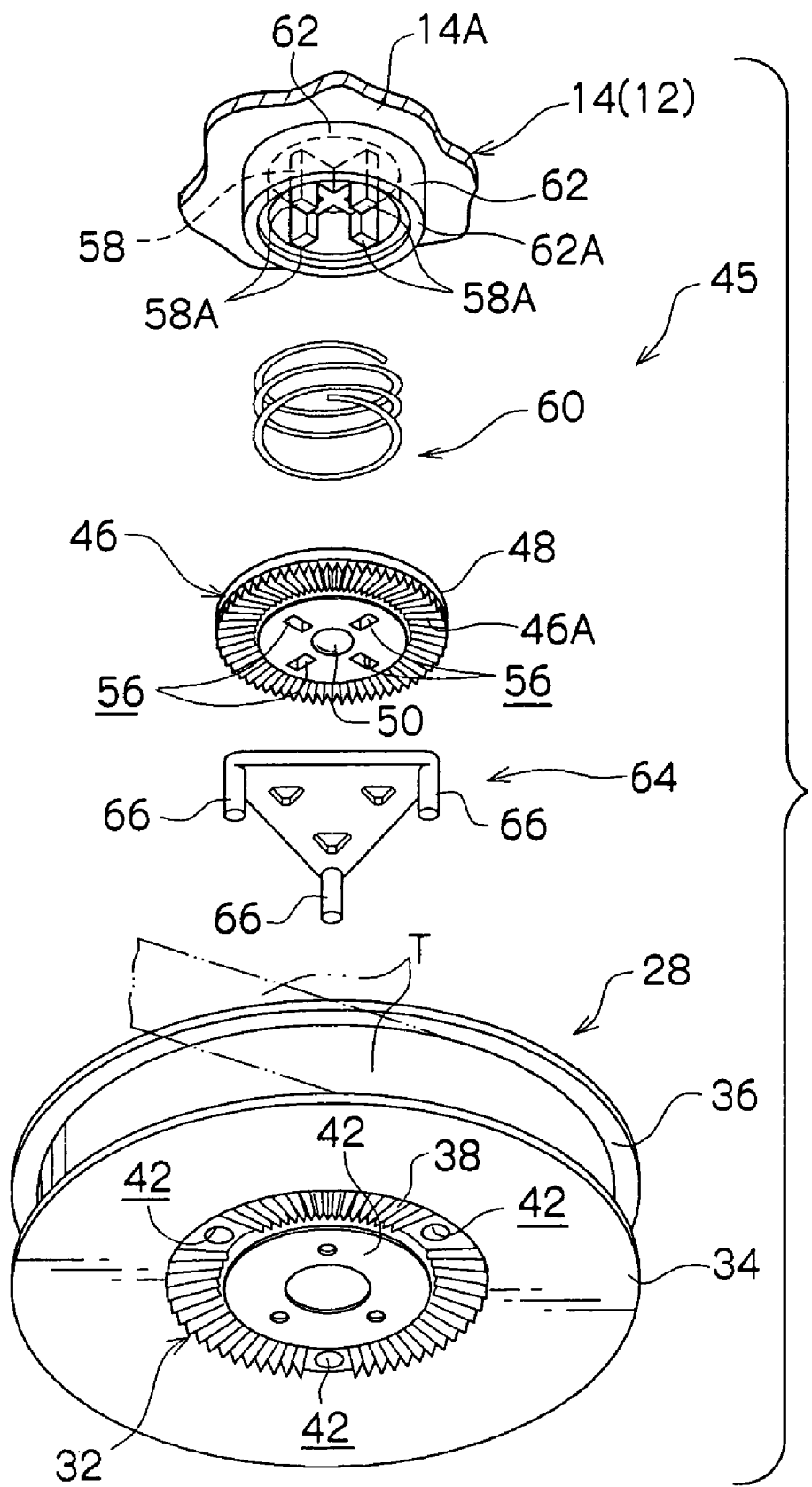
FIG. 5 is an exploded perspective view showing the lock mechanism constituting the recording tape cartridge according to the embodiment of the invention as seen from below.

As also shown in FIG. 5, the bottom portion 32B of the reel hub 32 has a lower end portion which slightly projects from the lower surface of the lower flange 34, and a annularly formed reel gear 38 which is provided near the periphery of the lower surface. The reel gear 38 can be meshed with a drive gear 102 provided at the distal end of a rotating shaft 100 of the drive device. Through holes 40 which penetrate through the bottom portion 32B (reel gear 38) are formed at three positions formed at equal intervals on a circumference around a position where the reel gear 38 is installed. The diameter of each of the through holes 40 is set to be larger than the gear pitch of the reel gear 38, and teeth of the reel gear 38 are not provided around the through holes 40.

Furthermore, inside the reel gear 38 on the lower end surface of the bottom portion 32B of the reel hub 32, a reel plate 42 formed from a magnetic material and capable of being attracted by a magnet 104 provided inside the drive gear 102 of the rotating shaft 100 is integrally formed by insert molding. As shown in FIG. 2, the reel hub 32 has its lower end portion projecting from the lower flange 34 on the bottom portion 32B intruded (loosely fitted) in the gear opening 20 of the case 12 in a state in which the lower peripheral portion (portion near the boundary between the bottom portion 32B and the lower flange 34) of the bottom portion 32B is disposed in abutment with the upper end portion of the annular rib 22. In this manner, the reel gear 38 and the reel plate 42 are exposed to the outside of the case 12.

Figure 4:
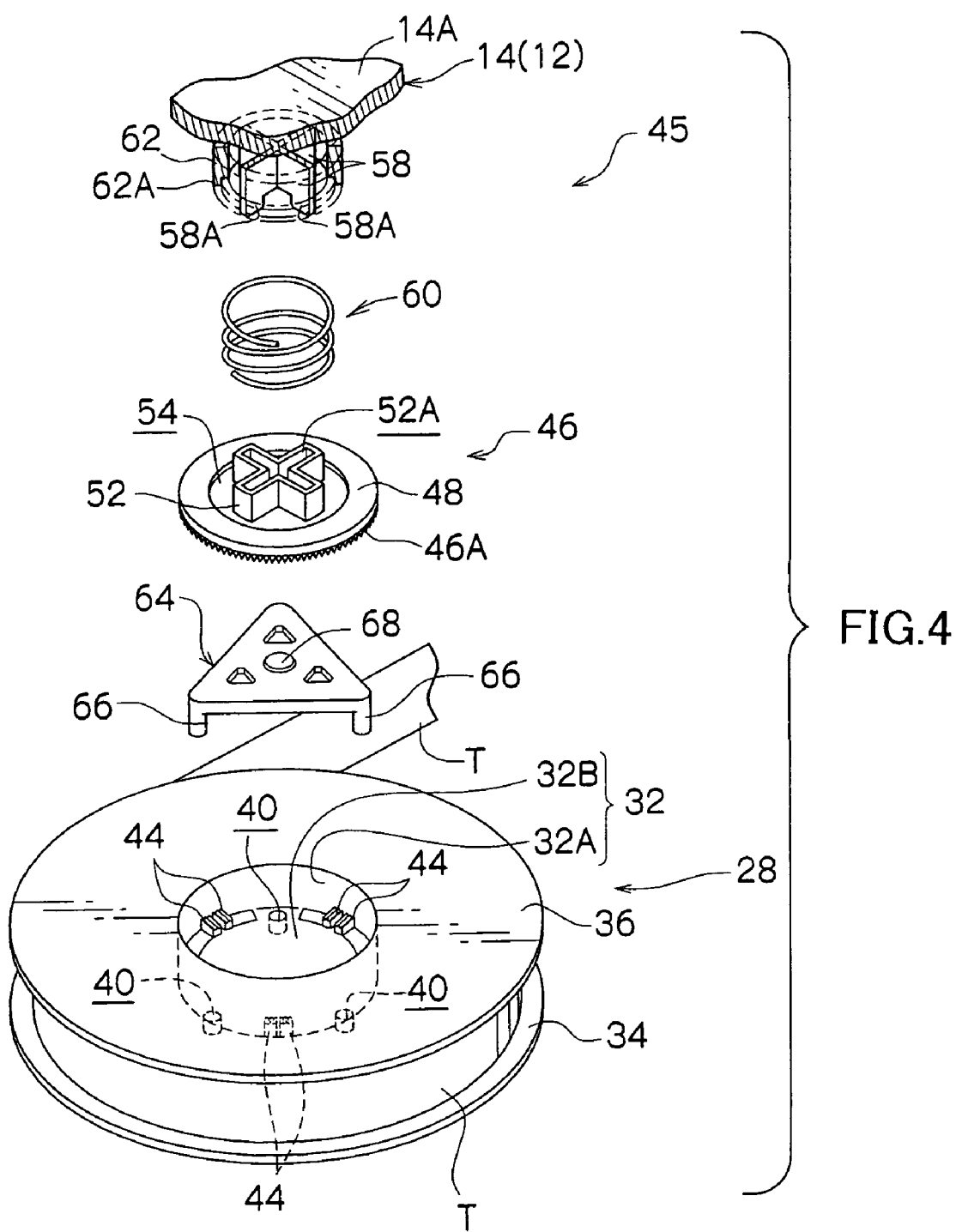
FIG. 4 is an exploded perspective view showing a lock mechanism constituting the recording tape cartridge according to the embodiment of the invention as seen from above.

On the other hand, as shown in FIG. 4, at three positions between the through holes 40 on the upper surface of the bottom portion 32B of the reel hub 32, three pairs of (totalling six) engagement projections 44 are provided upright at equal intervals on a circumference coaxial with the reel hub 32, respectively. A gear tooth 44A is formed on the distal end portion (upper end portion) of each of the engagement projections 44 (see FIG. 2). The gear teeth 44A can be meshed with a braking gear 46A of a braking member 46.

(Configuration of Lock Mechanism)

The recording tape cartridge 10 includes a lock mechanism 45 serving as a braking unit to prevent the reel 28 from rotating when the cartridge is not in use. As shown in FIGS. 4 and 5, the lock mechanism 45 includes the braking member 46 serving as a "pressed member" in the invention.

The braking member 46 includes a disk portion 48 formed in a generally disk-like shape. The braking gear 46A, which can be meshed with the gear teeth 44A of the reel 28, is annularly formed near the periphery of the lower end surface of the disk portion 48. A pivot portion 50, which is brought into contact with a release pad 64 which will be described later, is convexly formed at a portion corresponding to the axial center on the lower surface of the disk portion 48. The pivot portion 50 is formed in a generally spherical shape so as to be brought substantially into point contact with the release pad 64.

The braking member 46 includes a cross-shaped projection 52 which is cross-shaped as seen in a plan view and provided upright on the upper surface of the disk portion 48. Inside the cross-shaped projection 52, a cross-shaped guide groove 52A corresponding to the cross-shaped projection 52 is formed. More specifically, the cross-shaped projection 52 constitutes the groove wall of the cross-shaped guide groove 52A. Outside the cross-shaped projection 52 on the upper surface of the disk portion 48, a spring holding recess 54 surrounded by an annular wall portion as seen in a plan view is formed.

As shown also in FIG. 5, the braking member 46 includes through holes 56 penetrating through the disk portion 48 in the direction of thickness. The through holes 56 are formed in a rectangular shape corresponding to four radial outside parts of the cross-shaped guide groove 52A formed in a cross shape as seen in a plan view except for a crossing part which is a part corresponding to the axial center in the cross-shaped guide groove 52A. Thus, the through holes 56 communicate with the radial outside parts of the cross-shaped guide groove 52A. The through holes 56 are located radially outside the pivot portion 50.

The braking member 46 described above is, as a whole, integrally formed by resin molding. The braking member 46 is substantially coaxially inserted in the cylindrical portion 32A of the reel hub 32 such that the braking member 46 can be vertically moved (in the axial direction of the reel 28). More specifically, the braking member 46 vertically moves to make it possible to position the braking gear 46A at a meshing position (hereinafter referred to as rotation lock position or a meshing position) where the braking gear 46A is meshed with the gear teeth 44A of the engagement projections 44 provided on the reel hub 32 and a position (releasing position) where the meshing state is released.

A cross-shaped rib 58 (see FIG. 2 to FIG. 5) formed to extend downward from the top panel 14A of the case 12 is inserted into the cross-shaped guide groove 52A of the cross-shaped projection 52 of the braking member 46. The cross-shaped rib 58 has a rotation preventing shape that prevents rotation thereof, which shape may be defined by disposing two thin plate pieces in perpendicularly crossing relationship with each other. The cross-shaped rib 58 is engaged with the cross-shaped projection 52 (groove wall of the cross-shaped guide groove 52A) to prevent the braking member 46 from rotating with reference to the case 12.

In this manner, the braking member 46 prevents the reel 28 from rotating when the braking member 46 is located at a rotation lock position where the braking gear 46A is meshed with the gear teeth 44A of the reel hub 32. The cross-shaped rib 58 is kept in a state such that the rib 58 is inserted in the cross-shaped guide groove 52A over an entire vertical moving stroke of the braking member 46, thus serving to guide the braking member 46 to be movable in the vertical direction.

Each projecting piece 58A extends downward from four positions except for the crossing part of the lower end portion of the cross-shaped rib 58. The projecting pieces 58A are designed to intrude into the through holes 56 of the braking member 46 (extend through the through holes and project at the braking gear 46A side) when the braking member 46 is located at a releasing position. In this manner, the cross-shaped rib 58 having the projecting pieces 58A considerably increases an amount of engagement (insertion depth) in the braking member 46 and suppress an inclination of the braking member 46 with reference to the case 12. In this embodiment, an amount of engagement between the cross-shaped rib 58 including each projecting piece 58A and the braking member 46 located at the rotation lock position in the axial direction is set at a value which is sufficiently larger than the entire moving stroke of the braking member 46 (see FIG. 2 and FIG. 3).

A compression coil spring 60 serving as an "elastic member" is interposed in a compression state between the spring holding recess 54 of the braking member 46 and the top panel 14A. The compression coil spring 60 has one end which intrudes into the spring holding recess 54 to be brought into contact with the bottom surface (upper surface of the disk portion 48) of the spring holding recess 54, and has the other end which is brought into contact with (engaged with) the lower surface of an annular spring seat 62 which is provided outside the cross-shaped rib 58 on the top panel 14A so as to extend downward.

The spring seat 62 is formed in a cylindrical shape having a diameter corresponding to the winding diameter of the compression coil spring 60 so that the cross-shaped projection 52 of the braking member 46 located at a releasing position can be intruded in the spring seat 62. The other end of the compression coil spring 60 is intruded in an annular wall portion 62A which is provided to extend downward from the peripheral portion of the spring seat 62, thereby preventing the compression coil spring 60 from being displaced in the radial direction. With the above configuration, the compression coil spring 60 is substantially coaxially disposed with reference to the reel 28 and the braking member 46. A projection length of the spring seat 62 from the top panel 14A will be described later.

In the lock mechanism 45, the braking member 46 is biased downward by a biasing force of the compression coil spring 60 to cause the braking gear 46A to be normally meshed with the gear teeth 44A as shown in FIG. 2, so that the reel 28 is reliably prevented from an inadvertent rotation (the braking member 46 is located at the rotation lock position). In addition, due to the biasing force, the reel 28 meshed with the braking member 46 at the engagement projections 44 is also biased downward so as to cause the peripheral portion of the lower surface of the bottom portion 32B to be brought into contact with the annular rib 22 as described above, thereby preventing the reel 28 from rattling in the case 12.

The release pad 64 serving as a release member is interposed between the bottom portion 32B and the braking member 46 in the reel hub 32 (cylindrical portion 32A) of the reel 28. The release pad 64 is formed in the shape of a substantially equilateral triangle as seen in a plan view, and three columnar leg portions 66 corresponding to the through holes 40 of the bottom portion 32B are provided to project from the lower surfaces near the apexes of the triangle, respectively. A sliding contact projection 68 is provided to project low, which is adapted to be brought into contact with the pivot portion 50 of the braking member 46. The release pad 64 is integrally formed by resin molding as a whole.

The release pad 64 is placed on the bottom portion 32B of the reel hub 32 (the lower surface is brought into contact with the upper surface of the bottom portion 32B) so as not to interfere with each engagement projection 44 in a state in which the leg portions 66 are vertically movably inserted into the through holes 40. In this state, the leg portions 66 project from the lower end portions of the through holes 40 such that the distal ends of the leg portions 66 are located at a level equal to the level of the tooth tops of the reel gear 38. The release pad 64 is configured such that the sliding contact projection 68 is brought into contact with the pivot portion 50 of the braking member 46 located at the rotation lock position, so that the projecting state of the leg portions 66 is normally kept by the biasing force of the compression coil spring 60.

On the other hand, when the leg portions 66 are pressed and moved upward against the biasing force of the compression coil spring 60, the release pad 64 pushes up the braking member 46 having the pivot portion 50 brought into contact with the sliding contact projection 68 to release the meshing state between the braking gear 46A and the gear teeth 44A of the engagement projections 44 (the braking member 46 is moved to the releasing position).

More specifically, as shown in FIG. 3, the leg portions 66 of the release pad 64 are pressed by the tooth tops of the drive gear 102 such that the rotating shaft 100 relatively moves upward with reference to the case 12 when the drive gear 102 is meshed with the reel gear 38 of the reel 28. In this manner, the reel 28 floats in the case 12 against the biasing force of the compression coil spring 60 as a result of the meshing operation between the drive gear 102 and the reel gear 38 (the lower flange 34 is spaced apart from the annular rib 22), and also the rotation prevention state kept by the braking member 46 is released to permit the reel 28 to rotate in a non-contact state in the case 12.

In this manner, in the lock mechanism 45, the cross-shaped rib 58 and the pivot portion 50 are always disposed in contact with each other by the biasing force of the compression coil spring 60. When the reel 28 is ready to rotate, the release pad 64 locates the leg portions 66 in the through holes 40 of the reel hub 32. When the rotating shaft 100 rotates, the release pad 64 rotates together with the reel 28. For this reason, the braking member 46, which cannot rotate with reference to the case 12, and the release pad 64 relatively rotate during the rotation of the reel 28, and the pivot portion 50 and the sliding contact projection 68 are brought into sliding contact with each other in a generally point contact state while being pressed against each other by the biasing force of the compression coil spring 60.

In the lock mechanism 45, assuming that a length (hereinafter referred to as a "load length of the compression coil spring 60" or merely a "load length") of the compression coil spring 60 in the axial direction when the braking member 46 is located at the releasing position is represented by L as shown in FIG. 6, and that a coefficient of dynamic friction between the pivot portion 50 and the sliding contact projection 68 is represented by $\mu$, the arrangment is set up so as to satisfy the relationship $\mu \times L \leq 0.4$. More specifically, the coefficient of dynamic friction $\mu$ between the pivot portion 50 and the sliding contact projection 68 which comprise a resin material to achieve a reduced resistance of sliding contact is approximately 0.1. Thus, this numerical value is substituted in the above formula, so that the load length L of the compression coil spring 60, i.e., a distance between the upper surface of the disk portion 48 of the braking member 46 located at the releasing position (position set when the reel 28 rotates) and the lower surface of the spring seat 62, is set at 4.0 mm or less.

In this embodiment, the load length L of the compression coil spring 60 is set at 2.9 mm, which is smaller than 4.0 mm. In order to realize this, a configuration in which the spring seat 62 with which one end of the compression coil spring 60 is disposed in contact is formed to project downward (to the braking member side) from the top panel 14A of the case 12. More specifically, the projection length of the spring seat 62 with reference to the top panel 14A is determined such that the load length L of the compression coil spring 60 is set at 2.9 mm. In the compression coil spring 60, a wire diameter is approximately set at 0.8 mm, and the number of turns ranges from 2.5 to 3. FIG. 6 shows the cross-shaped rib 58 partially cut away.

The relational expression $\mu \times L \leq 0.4$ established between the load length L and the coefficient of dynamic friction $\mu$ is a discriminant for stability to determine whether or not the brake member 46 is subjected to self-excited vibration. The details of the discriminant will be described later together with the operation of the embodiment.

An operation of the embodiment will be described below.

In the recording tape cartridge 10 having the above configuration, the braking member 46 is located at the rotation lock position by the biasing force of the compression coil spring 60 to mesh the braking gear 46A with the gear teeth 44A of the engagement projections 44. For this reason, the reel 28 is set in a rotation lock state in which the reel 28 is prevented from rotating with reference to the case 12. The reel 28 is pressed against the annular rib 22 near the edge (boundary portion between the bottom portion 32B and the lower flange 34) by the biasing force of the compression coil spring 60 transmitted through the braking member 46 (and the release pad 64) meshed with the engagement projections 44.

At this time, the reel gear 38 of the reel 28 is exposed from the gear opening 20, and the leg portions 66 of the release pad 64 penetrate the through holes 40 to face the outside from the gear opening 20, respectively. The opening 18 is closed by the leader block 30.

On the other hand, when the magnetic tape T is used, the recording tape cartridge 10 is loaded on a bucket (not shown) of the drive device. When the recording tape cartridge 10 is loaded on the bucket with a predetermined depth, the bucket moves downward, and the rotating shaft 100 of the drive device relatively comes close to the gear opening 20 of the case 12 (moves upward) to hold the reel 28. More specifically, the rotating shaft 100 meshes the drive gear 102 with the reel gear 38 while attracting and holding the reel plate 42 in a non-contact state by the magnet 104 arranged at the distal end of the rotating shaft 100.

Due to the meshing between the reel gear 38 and the drive gear 102, the tooth tops of the drive gear 102 are respectively brought into contact with the distal ends (lower end surfaces) of the leg portions 66 of the release pad 64 to push up the release pad 64 against the biasing force of the compression coil spring 60. For this reason, the braking member 46 brought into contact with the release pad 64 at the pivot portion 50 also moves upward to release the meshing state between the braking gear 46A of the braking member 46 and the gear teeth 44A.

When the rotating shaft 100 further moves upward, the reel 28 is lifted upward together with the braking member 46 against the biasing force of the compression coil spring 60 (without changing the relative positions), and the lower flange 34 is separated from the annular rib 22. Due to the above configuration, the reel 28 floats in the case 12 and can rotate such that the reel 28 does not contact the inner surface of the case 12.

Due to the downward movement of the bucket, i.e., the recording tape cartridge 10 in the drive device, the positioning pins of the drive device are caused to intrude into the positioning holes 24 and 26 of the case 12, and the positioning surface of the drive device is brought into contact with the positioning surfaces 24A and 26A. In this manner, the case 12 is positioned in a horizontal direction and a vertical direction with reference to the drive device.

A drawing unit of the drive device removes the leader block 30 from the case 12 while engaging a drawing pin (not shown) of the drawing unit with the engagement recess 30A of the leader block 30 to guide the leader block 30 to the take-up reel of the drive device. In addition, the leader block 30 is fitted in the take-up reel to cause the arc surface 30B to partially constitute a take-up surface for taking up the magnetic tape T. In this state, when the leader block 30 rotates together with the take-up reel, the magnetic tape T is drawn from the case 12 through the opening 18 while being taken up by the reel hub of the take-up reel.

At this time, the reel 28 of the recording tape cartridge 10 is rotatably driven in synchronism with the take-up reel by a rotating force of the rotating shaft 100 transmitted by the drive gear 102 meshed with the reel gear 38. A recording/reproducing head arranged along a predetermined tape route of the drive device records information on the magnetic tape T or reproduces the information recorded on the magnetic tape T.

At this time, with the rotation of the reel 28, the pivot portion 50 of the braking member 46 which is prevented from rotating with reference to the case 12 is in sliding contact with the sliding contact projection 68 while being pressed against the sliding contact projection 68 of the release pad 64 rotating together with the reel 28 with reference to the case 12 by the biasing force of the compression coil spring 60.

On the other hand, when the magnetic tape T is rewound on the reel 28, and when the leader block 30 is held near the opening 18 of the case 12, the bucket on which the recording tape cartridge 10 is loaded is moved upward. At this time, the meshing state between the reel gear 38 and the drive gear 102 is released, and the contact between the drive gear 102 and the leg portions 66 of the release pad 64 is released. The release pad 64 moves downward together with the braking member 46 (while keeping the contact state between the release pad 64 and the braking member 46) due to the biasing force of the compression coil spring 60.

In this manner, the distal ends of the leg portions 66 of the release pad 64 respectively project from the through holes 40 until the level of the distal ends is almost equal to the tooth tops of the reel gear 38, and the braking gear 46A of the braking member 46 is meshed with the gear teeth 44A of the engagement projections 44. More specifically, the braking member 46 returns to the rotation lock position where the reel 28 is prevented from rotating. The reel 28 also moves downward and returns to an initial state in which the reel gear 38 is exposed from the gear opening 20 while being pressed against the annular rib 22 by the biasing force of the compression coil spring 60.

In this state, the recording tape cartridge 10 is ejected from the bucket, i.e., the drive device.

In the recording tape cartridge 10, when the braking member 46 is located at the releasing position, i.e., when the reel 28 rotates, the load length L of the compression coil spring 60 and the coefficient of dynamic friction μ between the pivot portion 50 and the sliding contact projection 68 are set to satisfy $\mu \times L \leqq 0.4$. That is, the coefficient of dynamic friction μ is set at 0.1, and the load length L is set at 2.9 mm, which is smaller than 4.0 mm. For this reason, self-excited vibration of the braking member 46 generated by sliding contact between the pivot portion 50 and the sliding contact projection 68 during the rotation of the reel 28 is suppressed.

More specifically, the relation $\mu \times L \leqq 0.4$ between the load length L and the coefficient of dynamic friction μ is a discriminant for stability which is used to decide whether the self-excited vibration of the braking member 46 caused by the rotation of the reel 28 is increased or attenuated in the drive system constituted by the case 12, the braking member 46, and the compression coil spring 60 as described above. In this case, the following facts are known. That is, when the relation given by the discriminant for stability is not satisfied, the braking member 46 is set in an oscillation state in which the amplitude of the self-excited vibration increases with time due to sliding contact between the pivot portion 50 and the sliding contact projection 68 with rotation of the reel 28. However, when the relation given by the discriminant for stability is satisfied, the self-excited vibration of the braking member 46 is attenuated. In the embodiment, on the basis of this knowledge, when the coefficient of dynamic friction μ is 0.1, the load length L is set at 2.9 mm to satisfy the discriminant for stability. For this reason, the self-excited vibration of the braking member 46 is attenuated to eliminate the vibration of the braking member 46 or to considerably reduce the amplitude.

Figure 7A:
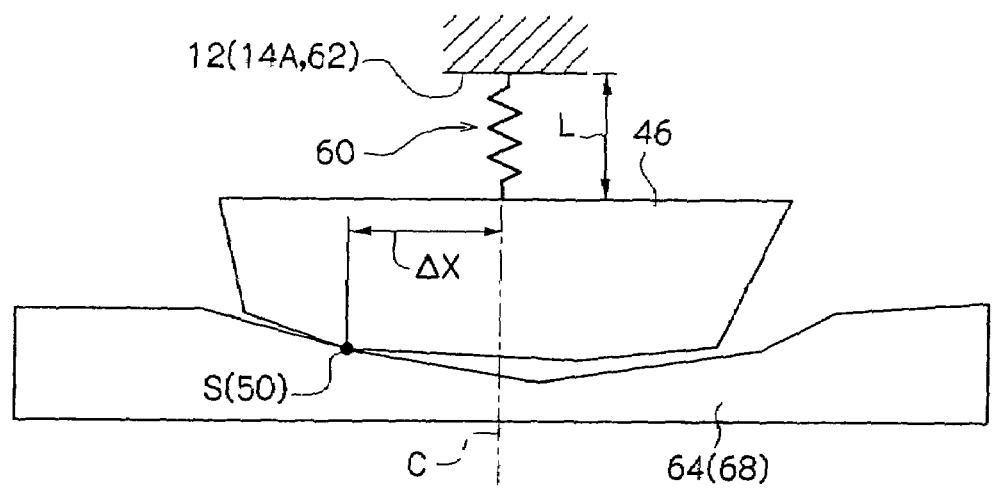
FIG. 7A is a pattern diagram for explaining a self-excited vibration generation mechanism of a braking member.
Figure 7B:
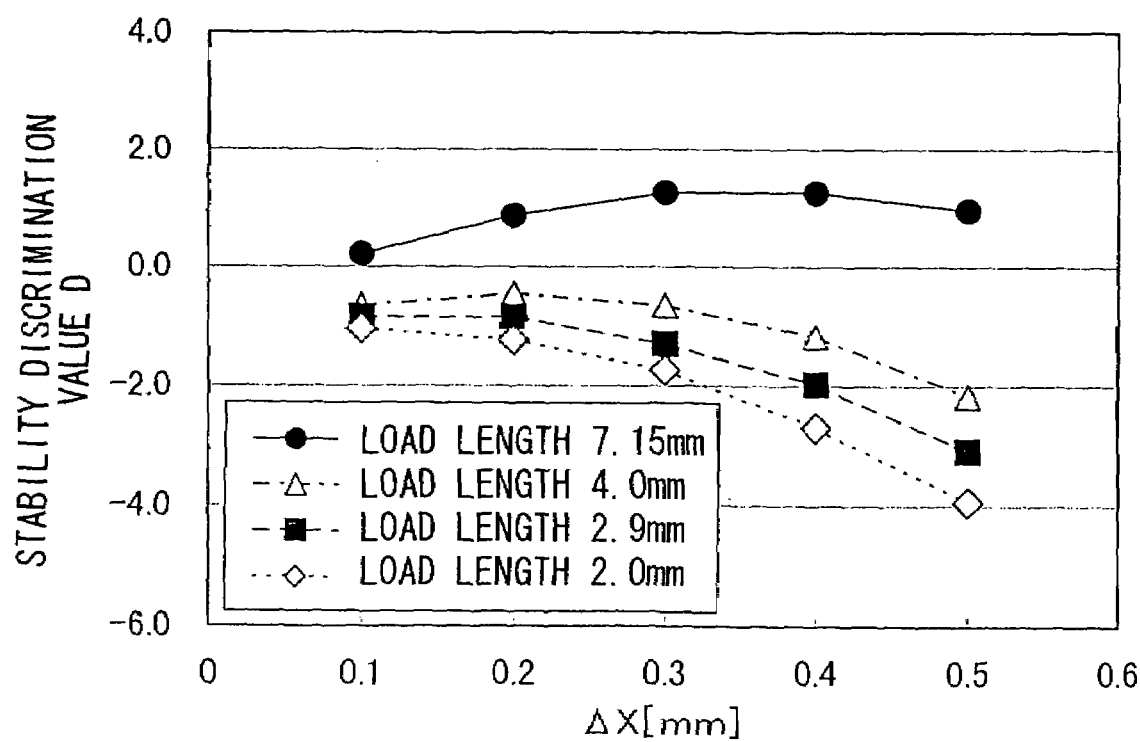
FIG. 7B is a graph showing vibration stability for respective heights of a centerline.

More specifically, the self-excited vibration of the braking member 46, as shown in the pattern diagram in FIG. 7A, is likely to occur when a sliding contact point S between the braking member 46 and the release pad 64 shifts from a rotating center C (center of relative rotation between the braking member 46 and the release pad 64) in a horizontal direction (direction along a rotating surface of the release pad 64) by a distance ΔX. FIG. 7A hyperbolizes the case in which the state or shape of the sliding contact portion is changed by abrasion (when shift easily occurs). Shift of the distance ΔX may occur due to dimensional error, assembling error, or the like of the braking member 46, the release pad 64, the reel 28, the rotating shaft 100, and the like. FIG.7B is a diagram (calculation result) showing a relation of a stability discrimination value D to the shift amount ΔX when the coefficient of dynamic friction μ is fixed at 0.1. The stability discrimination value D exceeding 0, (D>0) corresponds to a case where the braking member 46 is oscillated. The stability discrimination value D, which is equal to or smaller than 0 (D≦0) corresponds to a case where the braking member 46 is stable to attenuate the self-excited vibration of the braking member 46.

As is apparent from FIGS. 7A and 7B, in the configuration in which the load length L is 2.9 mm, i.e., $\mu \times L \leqq 0.4$, the braking member 46 is stable over the entire range of the shift amount ΔX, and the self-excited vibration of the braking member 46 is attenuated. It is understood that, in the configuration in which the load length L is 2.0 mm which is smaller than 2.9 mm, the braking member 46 is stable over the entire range of the shift amount ΔX so that the self-excited vibration of the braking member 46 is attenuated. On the other hand, it is understood that, in a configuration shown for comparison in which the load length L is 7.15 mm, i.e., $\mu \times L = 0.715 > 0.4$ is satisfied, the braking member 46 is unstable over the entire range of the shift amount ΔX to cause the self-excited vibration of the braking member 46 (the braking member 46 is oscillated).

It is understood that, in a configuration in which the load length L corresponding to the upper limit of the discriminant for stability is 4.0 mm ($\mu \times L = 0.4$), the braking member 46 is stable over the entire range of the shift amount ΔX to attenuate the self-excited vibration of the braking member 46. The diagram shown in FIG. 7B represents a result obtained by performing stability discrimination using an attenuation rate of about 0.01 in the drive system constituted by the case 12, the braking member 46, and the compression coil spring 60 (as the entire drive system) and a value, which is usually supposed in an actual device. Even though the attenuation rate is estimated to a small value which is close to 0.005, it is confirmed that the braking member 46 is stable when the stability discrimination value D is 0 or less in the range in which the discriminant for stability is satisfied (not shown).

In addition, in each of the measurements in which the attenuation rates of the drive system were set at 0.01 or 0.005, it has been confirmed that self-excited vibration of the braking member 46 is prevented under the conditions: load length L=4.0 mm and load length L=2.9 mm. Therefore, when the discriminant for stability is satisfied, sufficient self-excited vibration prevention (suppression) effect can be obtained in an actual device. In the embodiment in which the braking member 46 is formed of a resin material, the attenuation rate of the vibration system is about 0.01.

The diagram shown in FIG. 7B represents a calculation result obtained when loads at which the braking member 46 is pressed against the release pad 64 by the compression coil springs 60 having load lengths L are set at about 4N. Even when the pressing load was increased or decreased without changing the load lengths L, a diagram, which was almost equal to the diagram shown in FIG. 7B was obtained (not shown). Therefore, it is confirmed that the discriminant for stability is established without being influenced by a spring constant or a natural length of the compression coil spring 60.

As described above, in the recording tape cartridge 10, since the discriminant for stability is satisfied, self-excited vibration of the braking member 46 is prevented or suppressed without being dependent on the size of the shift amount ΔX of the sliding contact point S with reference to the rotating center C. Therefore, if abrasion occurs at the sliding contact portion between the pivot portion 50 and the sliding contact projection 68 to shift the sliding contact point S from the rotating center C, i.e., if self-excited vibration of the braking member 46 is likely to occur, in the recording tape cartridge 10 according to the embodiment, the self-excited vibration of the braking member 46 is prevented or suppressed.

In this manner, in the recording tape cartridge 10, variation of the biasing force of the compression coil spring 60 with rotation of the reel 28 is suppressed. In other words, transmission of the varying biasing force to the case 12 or the reel 28 as vibratory force is suppressed to make it possible casue the magnetic ape T to stably travel (draw or rewind).

As described above, in the recording tape cartridge according to the embodiment, vibration generated when the braking member 46 elastically supported on the case 12 is brought into sliding contact with the release pad 64 rotating together with the reel 28 can be suppressed. In addition, the self-excited vibration of the braking member 46 can be prevented or suppressed by setting the load length L and the coefficient of dynamic friction $\mu$ of the compression coil spring 60. For this reason, the manufacturing cost of the recording tape cartridge can be reduced because the number of parts does not increase, in contrast with, for example, a configuration in which a vibration attenuating member or the like is arranged.

As shown in FIG. 7B, when the shift amount $\Delta X$ is larger than a predetermined value, stability against self-excited vibration is improved. However, occurrence of forcible vibration is concerned. Since there is concern that forced vibration will occur, it is not preferable that the shift amount $\Delta X$ is intentionally (as design) set at a large value.

(Modification of Lock Mechanism)

A modification of the embodiment will be described below. Parts and portions that are basically the same as in the embodiment are denoted by the same reference numerals as in the embodiment and explanation thereof is omitted.

Figure 8:
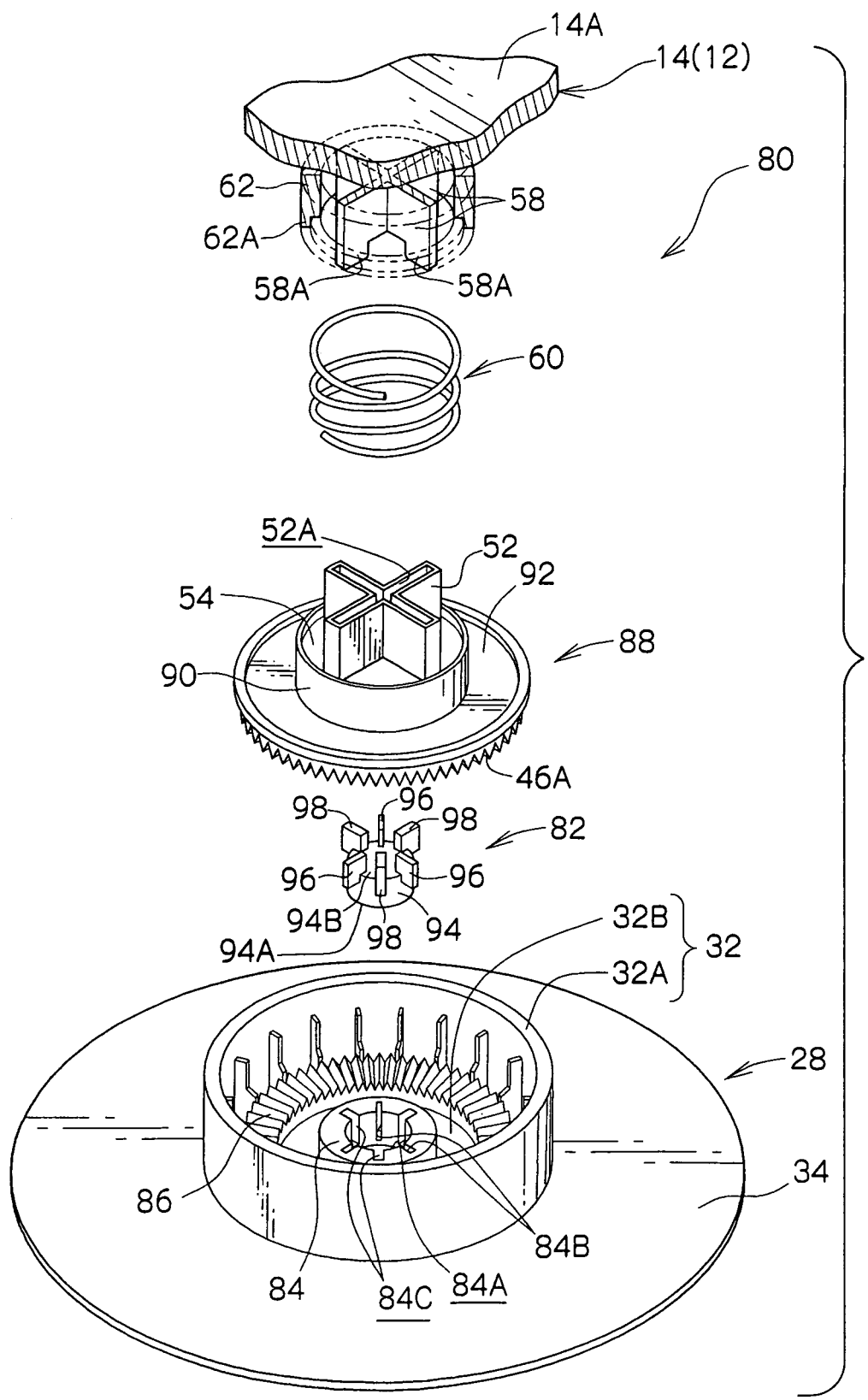
FIG. 8 is an exploded perspective view showing the lock mechanism according to a modification of the embodiment of the invention.
Figure 9:
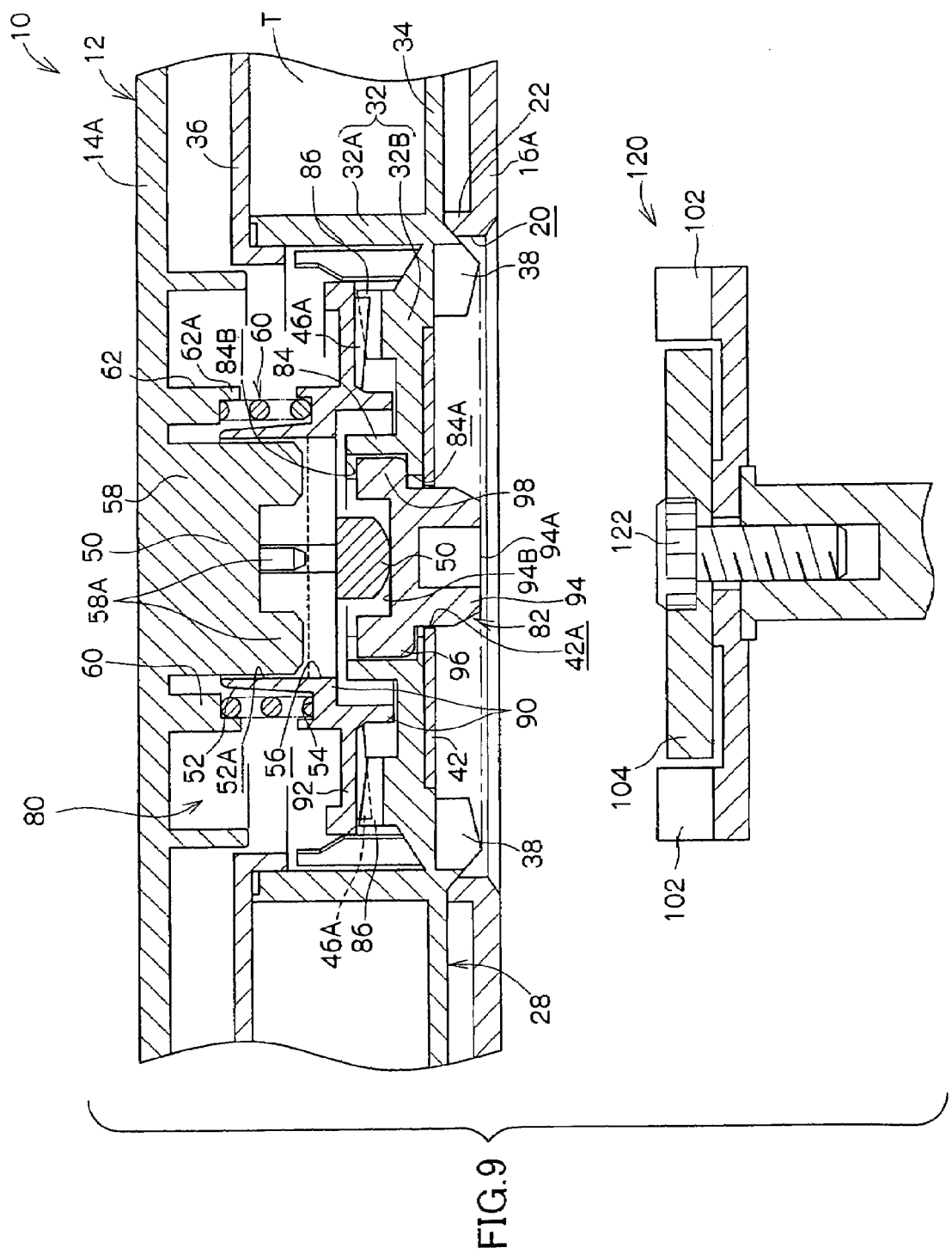
FIG. 9 is a cross-sectional view showing the lock mechanism according to the modification of the embodiment of the invention.

FIG. 8 shows a lock mechanism 80 according to the modification of the embodiment in an exploded perspective view, and FIG. 9 shows the lock mechanism 80 in a cross-sectional view. As shown in these drawings, the lock mechanism 80 is different from the lock mechanism 45 in that the lock mechanism 80 includes a clutch member 82 as a release member in place of the release pad 64. The modification will be described below in detail.

The reel 28 which is prevented by the lock mechanism 80 from rotating with reference to the case 12 includes, in place of the through holes 40, a clutch boss 84 which holds the clutch member 82 such that the clutch member 82 can be operated from the outside. The clutch boss 84 is formed in a generally cylindrical shape so as to project upward from a portion corresponding to the axial center of the bottom portion 32B of the reel hub 32. The inside of the clutch boss 84 serves as a through hole 84A which penetrates the bottom portion 32B in the direction of thickness. A through hole 42A is formed in a portion corresponding to a axial center of the reel plate 42 according to the modification in correspondence to the through hole 84A. Three rotation regulating grooves 84B and three stopper grooves 84C are continuously formed outside the through hole 84A in the radial direction. The rotation regulating grooves 84B and the stopper grooves 84C are closed at their bottoms. The stopper groove 84C is designed to be vertically shorter than the rotation regulating groove 84B. In addition, from the upper surface of the bottom portion 32B, an engagement gear 86 which can be meshed with the braking gear 46A is formed in a coaxially annular shape. In FIG. 8, the upper flange 36 is omitted.

A braking member 88 serving as a "pressed member" constituting the lock mechanism 80 includes a main body 90 which has a bottomed, generally cylindrical shape and which is closed at its top in place of the disk portion 48. The cross-shaped projection 52 and the spring holding recess 54 are formed on the upper surface of the bottom of the main body 90. The inner diameter of the main body 90 is designed to be sufficiently larger than the outer diameter of the clutch boss 84. The pivot portion 50 is convexly formed from the lower surface of the bottom of the main body 90. The pivot portion 50 does not project from the lower end of the main body 90. In addition, an annular plate 92 is extended from an intermediate part of the main body 90 along the axial line to the outside in the radial direction. The braking gear 46A is arranged on a lower surface of the annular plate 92.

In the lock mechanism 80, the load length L (distance between the lower surface of the spring seat 62 and the upper surface of the main body 90, i.e., the bottom surface of the spring holding recess 54) of the compression coil spring 60 obtained when the braking member 88 is located at a releasing position is set at 2.9 mm (smaller than 4.0 mm). The braking member 88 is integrally formed as a whole by resin molding.

The clutch member 82 includes a main body 94 which can slidably move along the axial line in the clutch boss 84 of the reel 28 and which is formed in a generally columnar shape. The main body 94 has a lower end surface serving as an operation surface 94A pressed against a release-pressing portion 122 of a rotating shaft 120. On the other hand, the upper end surface of the main body 94 serves as a sliding contact surface 94B with which the pivot portion 50 of the braking member 88 is brought into contact. Three rotation-regulating ribs 96 and three seating ribs 98 are extended from the upper portion of the main body 94 to the outside in the radial direction. The clutch member 82 is integrally formed as a whole by resin molding. A coefficient of dynamic friction $\mu$ between the sliding contact surface 94B and the pivot portion 50 of the braking member 88 is set at about 0.1.

In the clutch member 82, in a state in which the main body 94 intrudes in the through hole 84A (through hole 42A) of the clutch boss 84 and projects downward, the rotation regulating ribs 96 intrude in the rotation regulating grooves 84B, respectively, and the seating ribs 98 intrude in the stopper grooves 84C, respectively. When the braking member 88 is located at a rotation lock position at which the braking gear 46A is meshed with the engagement gear 86, the seating ribs 98 are brought into contact with the lower closed ends of the stopper grooves 84C, respectively. In this manner, the clutch member 82 is prevented from dropping from the reel 28, and the clutch member 82 is held such that the clutch member 82 can always rotate together with the reel 28 and can move and return from the rotation lock position upward.

The rotating shaft 120 of the drive device includes the drive gear 102, the magnet 104, and the release pressing portion 122 which presses the operation surface 94A of the clutch member 82 upward with an operation for causing the drive gear 102 provided at the axial center to be meshed with the reel gear 38.

Therefore, in the recording tape cartridge including the lock mechanism 80 according to the modification, the braking gear 46A of the braking member 88 is meshed with the engagement gear 86 of the reel 28 to prevent the reel 28 from rotating in the case 12 when the recording tape cartridge is not in use. When the magnetic tape T is used, the clutch member 82 is pressed against the release pressing portion 122 of the rotating shaft 120 on the operation surface 94A with an operation for causing the drive gear 102 to be meshed with the reel gear 38 by downward movement of the bucket. In this manner, the clutch member 82 is pushed up against a biasing force of the compression coil spring 60, the braking member 88 brought into contact with the clutch member 82 at the pivot portion 50 moves upward (moves to the releasing position), and the meshing state between the braking gear 46A of the braking member 88 and the engagement gear 86 is released.

When the rotation of the rotating shaft 120 is transmitted to rotate the reel 28, the pivot portion 50 of the braking member 88 which cannot rotate with reference to the case 12 is brought into sliding contact with the sliding contact surface 94B in a generally point contact state while being pressed against the sliding contact surface 94B of the clutch member 82 rotating together with the reel 28 by the biasing force of the compression coil spring 60.

In the configuration according to the modification, the load length L of the compression coil spring 60 is set at 2.9 mm, and the coefficient of dynamic friction $\mu$ between the pivot portion 50 and the sliding contact surface 94B is 0.1. For this reason, a discriminant for stability: $\mu \times L \leq 0.4$ is satisfied, and just the same as the embodiment, self-excited vibration of the braking member 88 can be prevented or suppressed. More specifically, even in the configuration according to the modification, the same effect as that of the above-described embodiment can be obtained.

The embodiment and modification exemplify the configurations in which the coefficient of dynamic friction $\mu$ is 0.1 and the load length L is 2.9 mm. However, the invention is not limited to these configurations, and the coefficient of dynamic friction $\mu$ and the load length L can be properly changed within a range in which the discriminant for stability: $\mu \times L \leq 0.4$ is satisfied, as a matter of course. Therefore, the invention is not limited to a configuration in which the braking members 46 and 88, the release pad 64, and the clutch member 82 entirely consist of a resin material (the coefficient of dynamic friction $\mu$ is about 0.1). For example, all or part of these components (for example, a sliding contact portion with a counter part) can be formed from a material properly selected from materials other than a resin material such as a metal material. In this case, an attenuation rate of a drive system constituted by the case 12, the braking member 46 (88), and the compression coil spring 60 is desirably 0.005 or more, and, more desirably, about 0.01.

In the above embodiment and the modification, the spring seat 62 (raising portion) is provided in the case 12 to set the load length L of the compression coil spring 60 during rotation of the reel 28 at 4.0 mm or less (discriminant for stability is satisfied). However, the invention is not limited by the shapes (configurations) of the braking member 46 and the case 12. Therefore, for example, the spring seat (raising portion) projecting from the disk portion 48 of the braking member 46 upward may be provided to set the load length L at 4.0 mm or less, or the discriminant for stability may be satisfied by another configuration.

In the above-mentioned embodiment and the modification, a preferable configuration, which includes the compression coil spring 60 as an elastic member is employed. However, as the elastic member in the invention, an elastic member which is located in a compression state between the case and the pressed member during rotation of the reel 28 and which presses the pressed member against the reel 28 or a member rotating together with the reel 28 may be satisfactorily used. Therefore, for example, a leaf spring or the like formed in a laterally-facing "V" shape can also be employed. The elastic member according to the invention is not limited to a preferable configuration, which is always set in a compression state (the braking member 46 and the reel 28 are prevented from being unstable). When the reel 28 does not rotate, the elastic member may be set in a natural state.

Figure 10:
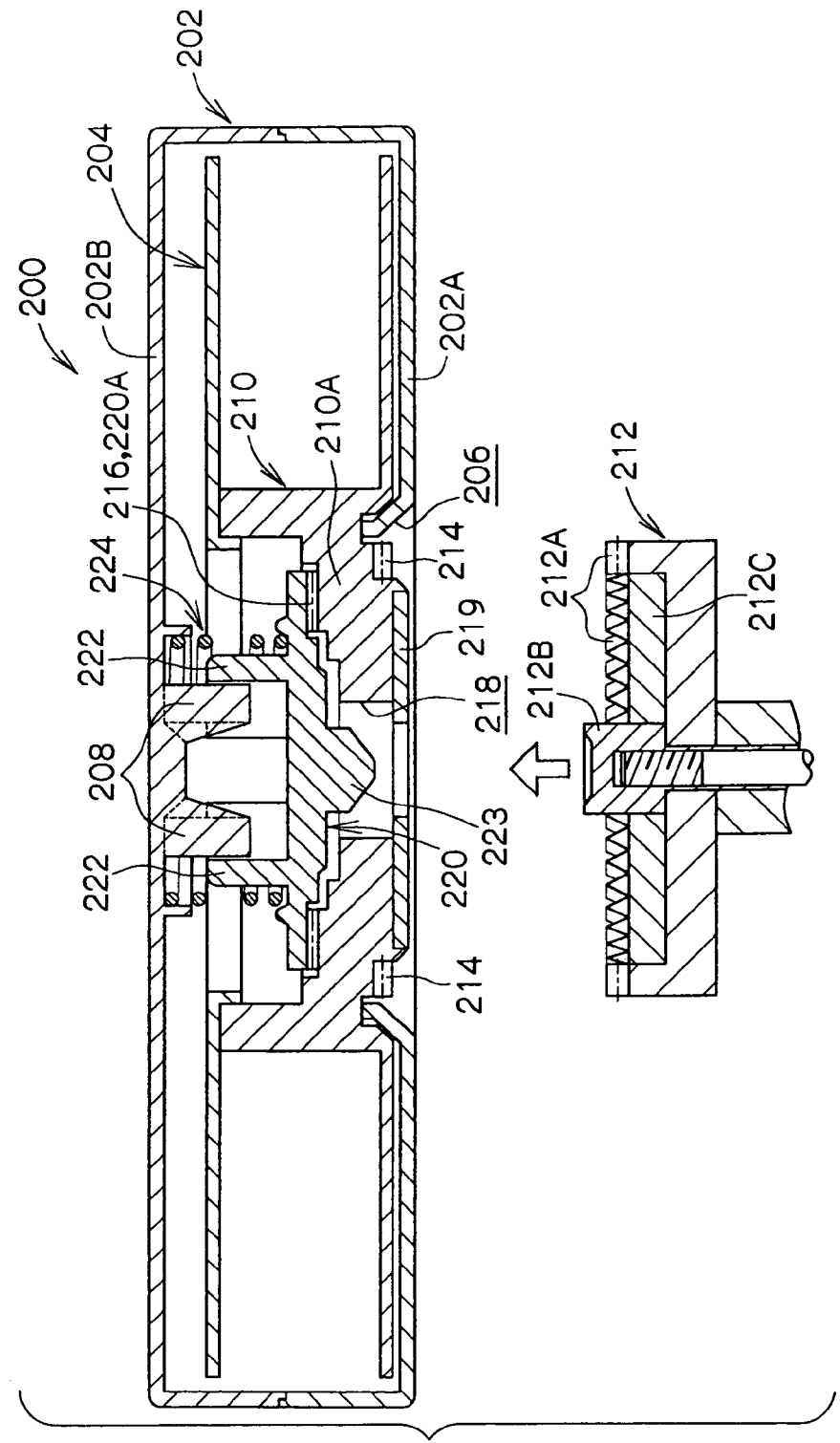
FIG. 10 is a cross-sectional view showing a first conventional recording tape cartridge.
Figure 11:
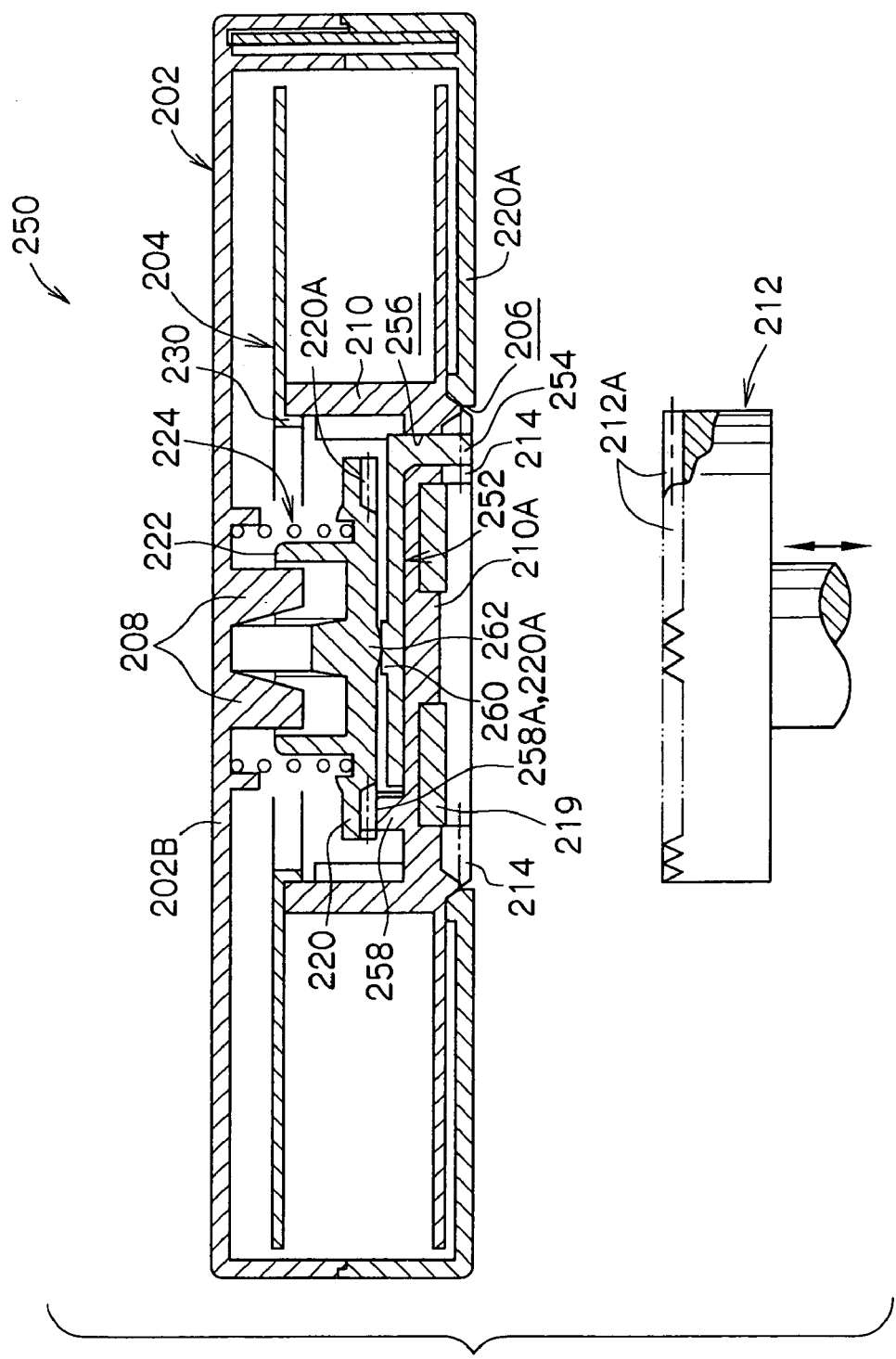
FIG. 11 is a cross-sectional view showing a second conventional recording tape cartridge.
Figure 12:
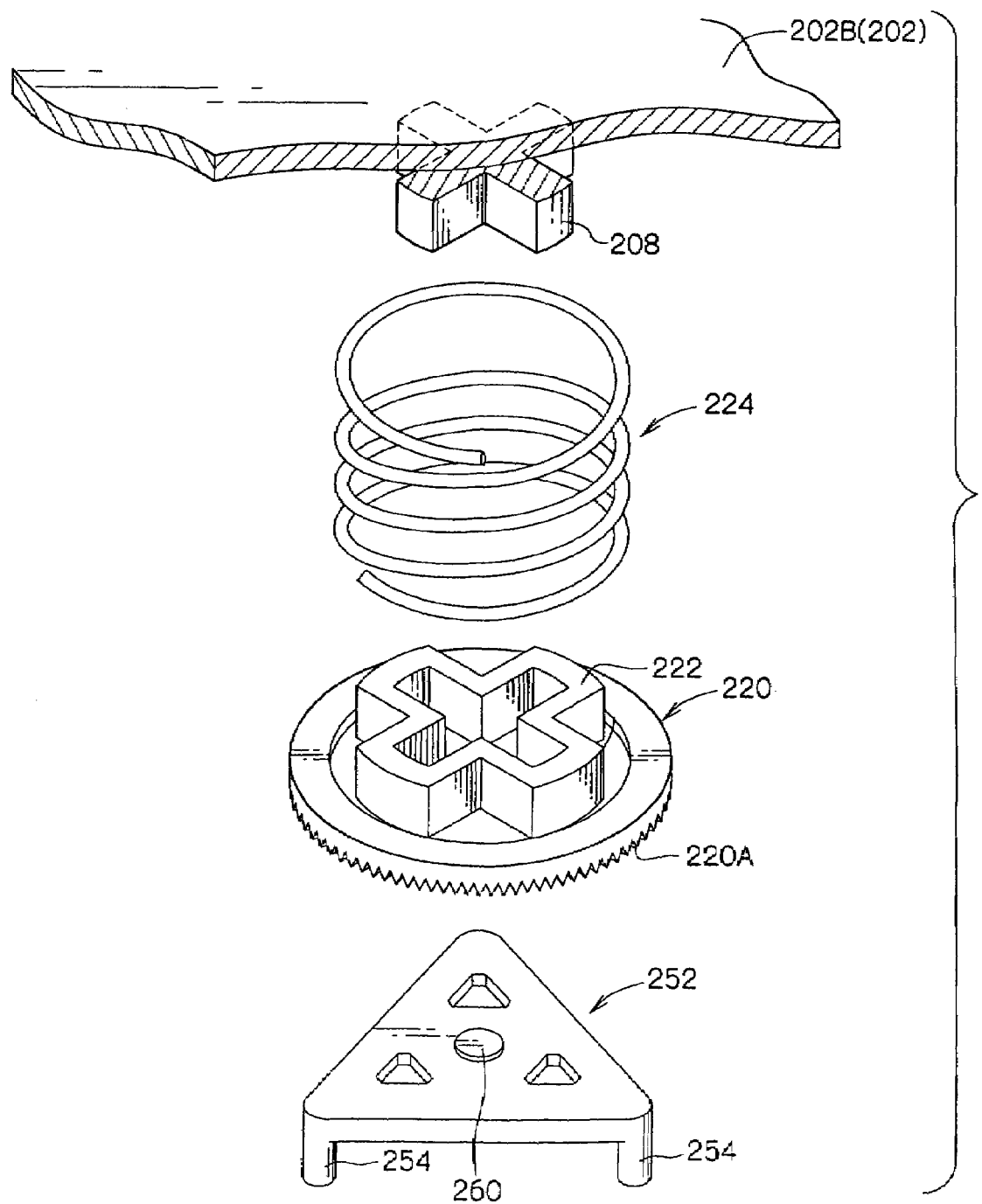
FIG. 12 is an exploded perspective view of a lock mechanism constituting the second conventional recording tape cartridge.
Figure 13:
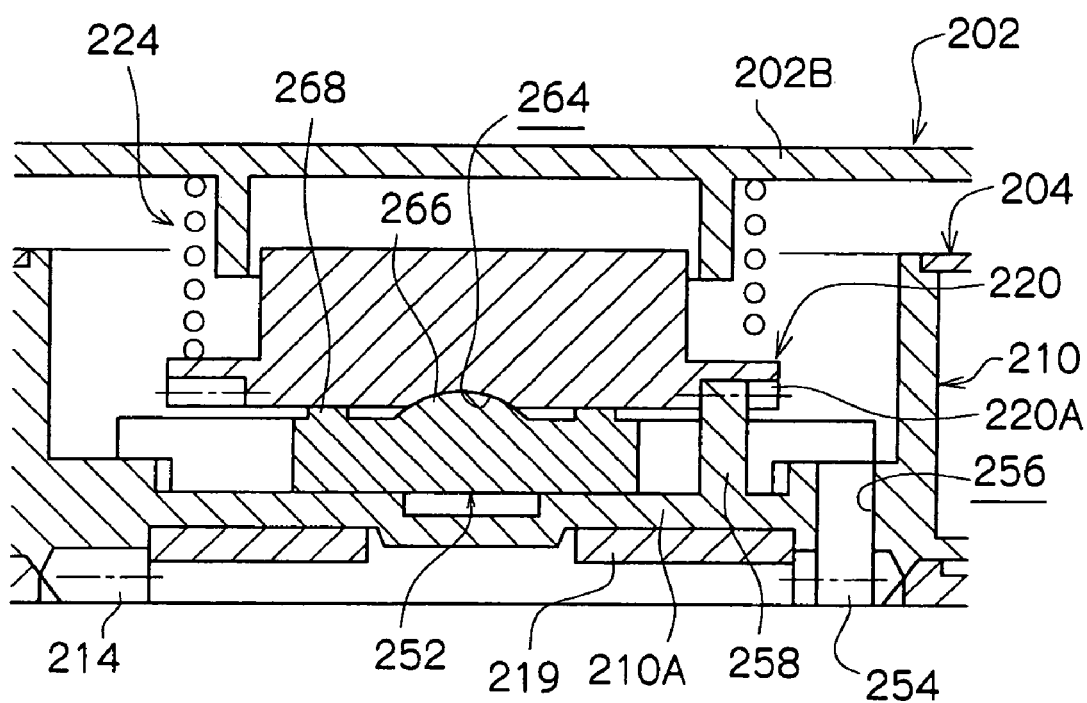
FIG. 13 is a cross-sectional view showing a third conventional recording tape cartridge.

Furthermore, in the embodiment and the modification, the braking members 46 and 88 are brought into sliding contact with the release pad 64 and the clutch member 82 serving as components of the recording tape cartridges 10, respectively. However, the invention is not limited to these configurations. For example, the invention may be applied to configurations in which the braking members 46 and 88 are brought into sliding contact with components (parts) of the rotating shafts 100, respectively. Therefore, for example, a load length L which is a distance between the distal end of the pivot portion 223 of the braking member 220 shown in FIG. 10 and the top panel 202B (spring seat 62) and the coefficient of dynamic friction $\mu$ between the pivot portion 223 and the release portion 212B may be set to satisfy the discriminant for stability.

Figure 14:
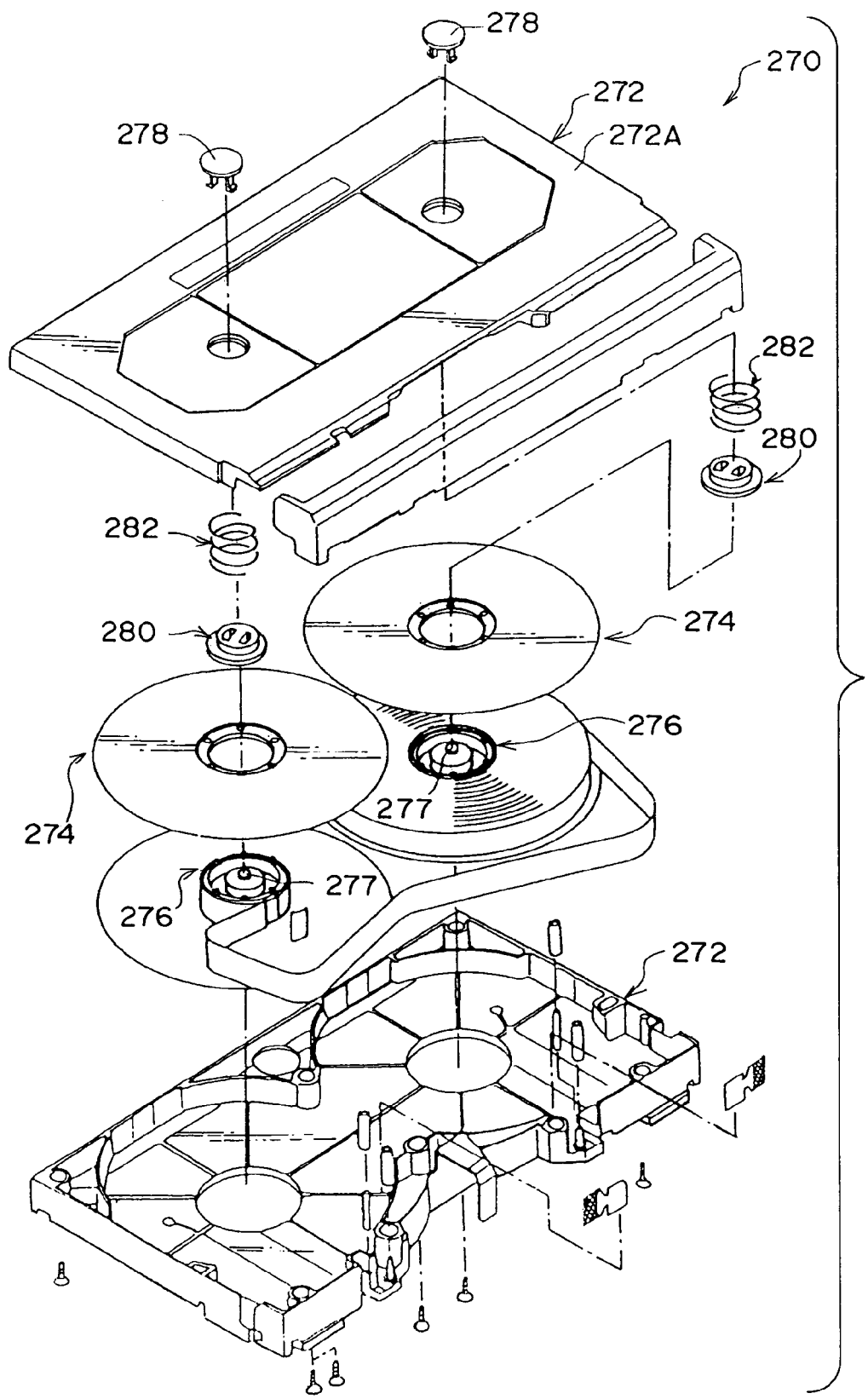
FIG. 14 is a cross-sectional view showing a fourth conventional recording tape cartridge.
Figure 15:
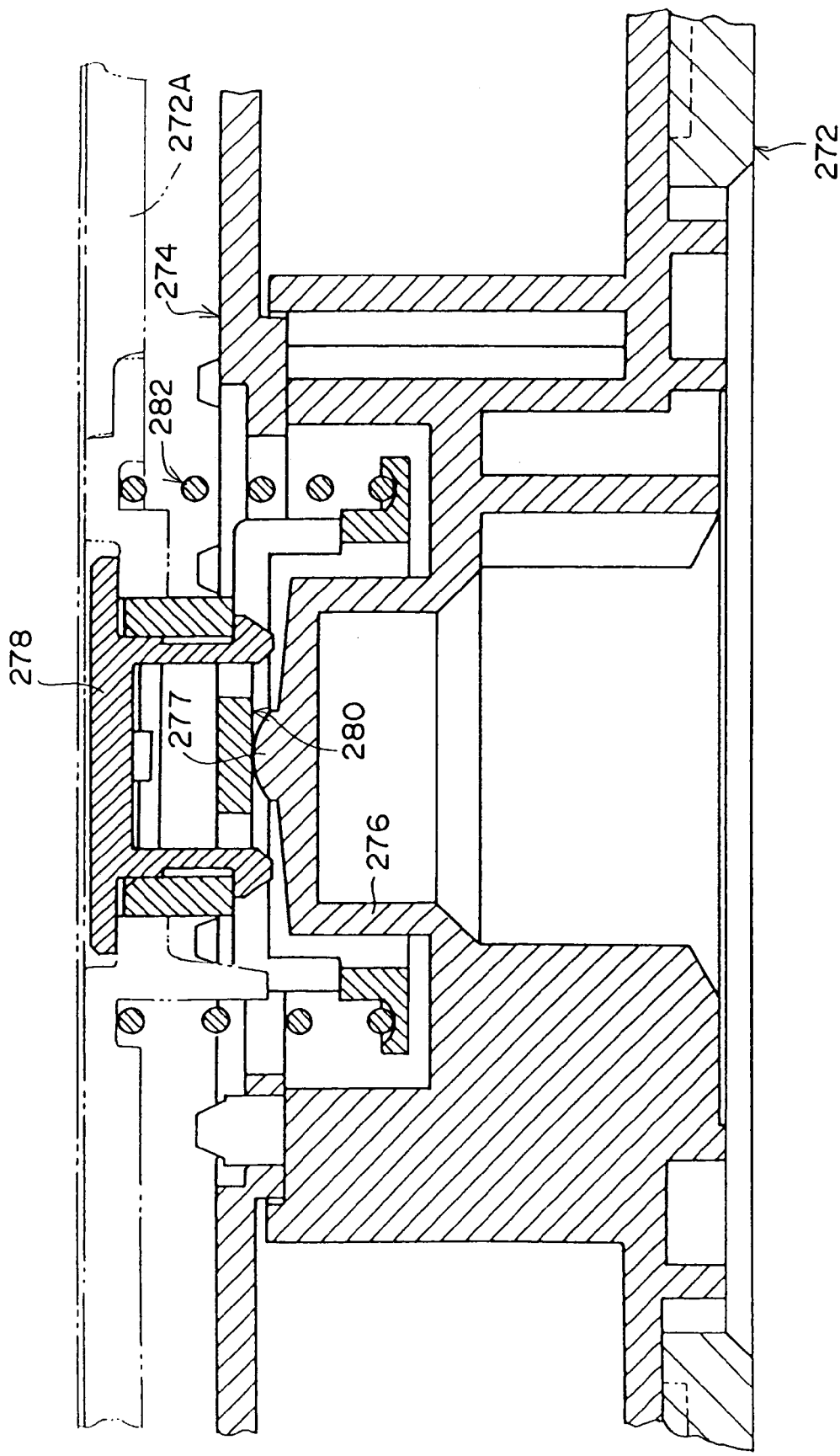
FIG. 15 is a cross-sectional view showing a support state of a reel holder constituting the fourth conventional recording tape cartridge.

Still furthermore, in the embodiment and the modification, the invention is applied to the lock mechanisms 45 and 80. However, the invention can be applied to a configuration having a pressed member which is elastically supported on the case 12 and which is brought into sliding contact with the reel 28 or a member (portion) rotating together with the reel 28 even though the pressed member has any configuration (shape). Therefore, for example, in the two-reel recording tape cartridge 270 as shown in FIGS. 14 and 15, a load length L of the compression coil springs 282 during rotation of the reels 274 and coefficients of dynamic friction $\mu$ between the reel holders 280 and the pivot portions 277 may be set to satisfy the discriminant for stability.

In the embodiment, the braking members 46 and 88 are brought into sliding contact with the release pad 64 and the clutch member 82 in a point contact state, respectively. However, the invention is not limited to the configuration. For example, the braking member 46 or the like and the release pad 64 or the like may be brought into sliding contact with each other in a surface contact state with flat surfaces, spherical surfaces, conical surfaces, or the like.

Furthermore, the embodiment exemplifies the configuration in which the recording tape cartridge 10 has the leader block 30. However, the invention is not limited to the shape of the case 12, a drawing structure (configuration of a leader member) of the magnetic tape T, an opening/closing structure of the opening 18, and the like, as a matter of course. Therefore, for example, in the recording tape cartridge 10, a small columnar leader pin may be attached to the distal end of the magnetic tape T as a leader member, or a shielding member (slide door or the like moving along a predetermined straight line or an arc) for opening or closing the opening 18 may be arranged.

Still furthermore, in the embodiment, the magnetic tape T is used as a recording tape. However, the invention is not limited to the magnetic tape T. As a recording tape, a tape, which is recognized as a long tape-shaped information recording/reproducing medium on which information can be recorded and from which information can be reproduced, may be used. The recording tape cartridge according to the invention can be applied to a recording tape of any recording/reproducing type, as a matter of course.

What is claimed is:

1. A recording tape cartridge comprising:
   a reel on which a recording tape is wound;
   a case which rotatably accommodates the reel;
   a pressed member which is supported in the case such that the pressed member cannot rotate and can move into and out of contact with the reel along the axis line of the reel; and
   an elastic member interposed between the case and the pressed member, the elastic member pressing, in a compression state, the pressed member against a portion near a center of rotation of the reel or a member rotating together with the reel during rotation of the reel;

wherein a relation $\mu \times L \leq 0.4$ holds where L (mm) is a length of the elastic member along the axis line of the reel during the rotation of the reel, and $\mu$ is a coefficient of dynamic friction between the pressed member and the reel or the member rotating together with the reel.

2. A recording tape cartridge according to claim 1, wherein the coefficient of dynamic friction $\mu$ is set at approximately 0.1, and the length L of the elastic member is set at approximately 2.9 mm.

3. A recording tape cartridge according to claim 1, wherein an attenuation coefficient of a drive system constituted by the pressed member and the elastic member is equal to or greater than 0.005.

4. A recording tape cartridge according to claim 1, wherein one reel is accommodated in the case.

5. A recording tape cartridge according to claim 1, wherein two reels are accommodated in the case.

6. A recording tape cartridge comprising:

a reel having a reel hub provided with a first engagement portion and upper and lower flanges coaxially fixed to both end portions of the reel hub and having substantially equal diameters, a recording tape being wound on the reel hub between the upper and lower opposing flanges;

a case having a top panel and a bottom panel and rotatably accommodating the reel; and a lock mechanism including: a pressed member provided with a second engagement portion, the pressed member being disposed in the reel hub so as to be movable along an axis line thereof and supported non-rotatably with reference to the case; an elastic member interposed between an inner surface of the case and the pressed member; and a release member disposed in the reel hub so as to be movable along the axis line and rotatable with the reel, wherein when the recording tape cartridge is in non-use, the second engagement portion of the pressed member is brought into engagement with the first engagement portion of the reel hub by a biasing force of the elastic member, thereby preventing the reel from rotating, and when the recording tape cartridge is in use, the pressed member is moved against the biasing force of the elastic member as a result of the release member being moved toward an inside of the case in response to the recording tape cartridge being loaded into a drive device, thereby releasing the engagement between the first engagement portion and the second engagement portion and allowing the reel to rotate;

wherein a relation $\mu \times L \leq 0.4$ holds between a length L (mm) of the elastic member along an axis line of the reel when the elastic member is in a compressed state for allowing the reel to rotate and a coefficient of dynamic friction $\mu$ between the pressed member and the release member.

7. A recording tape cartridge according to claim 6, wherein one end of the elastic member is disposed in contact with a bottom surface of a recess formed in the pressed member, another end of the elastic member being disposed in contact with a lower surface of a seat portion convexly formed on an inner surface of the top panel of the case; and a projection length of the seat portion from the top panel is determined such that the length L of the elastic member is approximately 2.9 mm.

8. A recording tape cartridge according to claim 6, wherein an opening is formed through the bottom panel of the case, and a reel positioning rib is provided at an edge of the opening.

9. A recording tape cartridge according to claim 8, wherein an annular reel gear is formed at a lower end surface of a bottom portion of the reel hub near a periphery of the lower end surface; the reel gear is exposed to an outside of the case through the opening formed through the bottom panel of the case; and the reel gear is engageable with a drive gear of the drive device when the recording tape cartridge is loaded into the drive device.

10. A recording tape cartridge according to claim 6, wherein the pressed member and the release member are formed from resin.

11. A recording tape cartridge according to claim 6, wherein the pressed member and the release member are formed entirely or partially of a material other than resin.

12. A recording tape cartridge according to claim 6, wherein the pressed member and the release member are always in contact with each other due to a biasing force of the elastic member.

13. A recording tape cartridge according to claim 12, wherein the contact between the pressed member and the release member is substantially a point contact.

14. A recording tape cartridge according to claim 12, wherein the contact between the pressed member and the release member is substantially a surface contact.

15. A recording tape cartridge according to claim 6, wherein the elastic member is a compression coil spring.

16. A recording tape cartridge according to claim 6, wherein the elastic member is a leaf spring.

17. A recording tape cartridge according to claim 6, wherein:

the pressed member is a braking member including a disk portion, the disk portion including a cross-shaped projection provided on an upper surface thereof, the cross-shaped projection being formed with a cross-shaped groove in which a cross-shaped rib provided on an inner surface of the case is inserted, the disk portion further including a recess formed in the upper surface thereof for receiving one end of the elastic member, an annular braking gear formed as the second engagement portion on a lower surface thereof near a periphery of the lower surface, and a pivot portion formed at a portion corresponding to a axial center of the lower surface;

the release member is a release pad formed in a substantially equilateral triangular plate-like shape and provided convexly with three legs which are respectively inserted into three holes formed in the bottom of the reel hub, the release pad having convexly provided at a center of an upper surface thereof a sliding contact projection which is brought into contact with the pivot portion of the braking member; and engagement projections are provided as the first engagement portion on the bottom of the reel hub at equal intervals along a circumference coaxial with the reel hub, each of the engagement projections having provided on an upper end thereof a gear tooth capable of being meshed with the braking gear of the braking member.

18. A recording tape cartridge according to claim 6, wherein:

the pressed member is a braking member including a main body of a bottomed, generally cylindrical shape, the main body including a cross-shaped projection provided at an upper surface of a bottom portion thereof, the cross-shaped projection being formed with a cross-shaped groove in which a cross-shaped rib provided on an inner surface of the case is inserted, the main body further including a recess formed in the upper surface for receiving one end of the elastic member, an annular plate portion extending radially outwardly of the main body from an intermediate portion of the main body, a braking gear annularly formed as the second engagement portion near a periphery of a lower surface of the annular plate, and a pivot portion convexly provided at a portion corresponding to a axial center of the bottom of the main body;

the release member is a clutch member including a substantially columnar main body, the main body having a lower end surface serving as an operation surface and an upper end surface serving as a sliding contact surface which is contacted with the pivot portion of the braking member, the main body including three rotation regulating ribs and three seating ribs provided at an upper portion thereof and extended radially outwardly of the main body;

a substantially cylindrical clutch boss is provided on the bottom portion of the reel hub and extended upright from an axial line portion of the bottom portion of the reel hub to hold the clutch member so that the clutch member is operable from outside, the clutch boss including a through hole for receiving the clutch member, and three rotation regulating grooves and three stopper grooves in which the three rotation regulating ribs and the three seating ribs are fitted respectively; and an engagement gear is annularly formed as the second engagement portion on the bottom portion of the reel hub, the engagement gear being capable of being meshed with the braking gear of the braking member.

19. A lock mechanism for a recording tape cartridge comprising a reel having a reel hub provided with a first engagement portion and upper and lower flanges coaxially fixed to both end portions of the reel hub and having substantially equal diameters, a recording tape being wound on the reel hub between the upper and lower opposing flanges, and a case having a top panel and a bottom panel and rotatably accommodating the reel, the lock mechanism comprising:

a pressed member provided with a second engagement portion, the pressed member being disposed in the reel hub so as to be movable along an axis line thereof and supported non-rotatably with reference to the case;

an elastic member interposed between an inner surface of the case and the pressed member;

and a release member disposed in the reel hub so as to be movable along the axis line and rotatable with the reel, wherein when the recording tape cartridge is in non-use, the second engagement portion of the pressed member is brought into engagement with the first engagement portion of the reel hub by a biasing force of the elastic member, thereby preventing the reel from rotating, and when the recording tape cartridge is in use, the pressed member is moved against the biasing force of the elastic member as a result of the release member being moved toward an inside of the case in response to the recording tape cartridge being loaded into a drive device, thereby releasing the engagement between the first engagement portion and the second engagement portion and allowing the reel to rotate;

wherein a relation $\mu \times L \leq 0.4$ holds between a length L (mm) of the elastic member along an axis line of the reel when the elastic member is in a compressed state for allowing the reel to rotate and a coefficient of dynamic friction $\mu$ between the pressed member and the release member.

* * * * *